(12) United States Patent
Burhenn et al.

(10) Patent No.: US 12,312,851 B2
(45) Date of Patent: May 27, 2025

(54) SECURITY STRIP FOR A DOOR AND METHOD OF OPERATING A SECURITY STRIP

(71) Applicant: HÜBNER GmbH & Co. KG, Kassel (DE)

(72) Inventors: Marcel Burhenn, Großalmerode (DE); Frederik Franz, Kassel (DE); Daniel Hübsch, Fuldabrück (DE)

(73) Assignee: HÜBNER GmbH & Co. KG, Kassel (DE)

( * ) Notice: Subject to any disclaimer, the term of this patent is extended or adjusted under 35 U.S.C. 154(b) by 0 days.

(21) Appl. No.: 17/978,623

(22) Filed: Nov. 1, 2022

(65) Prior Publication Data
US 2023/0134584 A1 May 4, 2023

(30) Foreign Application Priority Data
Nov. 3, 2021 (EP) .................................. 21206246

(51) Int. Cl.
*E05F 15/43* (2015.01)
*E05F 15/42* (2015.01)
*E05F 15/73* (2015.01)

(52) U.S. Cl.
CPC .............. *E05F 15/43* (2015.01); *E05F 15/42* (2015.01); *E05F 15/73* (2015.01); *E05Y 2400/44* (2013.01); *E05Y 2400/54* (2013.01)

(58) Field of Classification Search
CPC . E05F 15/43; E05F 15/40; E05F 15/73; E05F 2015/434; E05F 2015/436; E05F 2015/435; B60J 10/80; B60J 10/24; B60J 10/30; B60J 10/16; B60J 10/74; B60J 10/18; B60J 10/248; B60J 10/84

USPC ....................................................... 49/26–28
See application file for complete search history.

(56) References Cited

U.S. PATENT DOCUMENTS

| | | | | |
|---|---|---|---|---|
| 4,274,226 A * | 6/1981 | Evans | ....................... | G01V 3/12 340/552 |
| 5,912,625 A * | 6/1999 | Scofield | ................... | E05F 15/43 49/27 |
| 6,205,710 B1 * | 3/2001 | Busse | ................... | G01S 15/878 49/27 |
| 6,304,178 B1 * | 10/2001 | Hayashida | .............. | E05F 15/43 340/552 |

(Continued)

FOREIGN PATENT DOCUMENTS

DE 202004014760 U1 12/2005

OTHER PUBLICATIONS

English Translation of DE202004014760.*
European Search Report European Search Report issued in EP21206246 dated Apr. 19, 2022.

*Primary Examiner* — Justin B Rephann
(74) *Attorney, Agent, or Firm* — Dinsmore & Shohl LLP

(57) ABSTRACT

The present disclosure concerns a safety strip for a door, in particular for a door of a means of transport. The safety strip is elastic and/or flexible, has at least one receiving space, and comprises a sensor arrangement. The sensor arrangement is set up to emit electromagnetic radiation into a monitored area and to receive such radiation from the monitored area. The sensor arrangement is arranged in the receiving space in such a way that the safety strip completely encloses the sensor arrangement at least in one plane.

19 Claims, 17 Drawing Sheets

(56) References Cited

U.S. PATENT DOCUMENTS

Figure 1A:
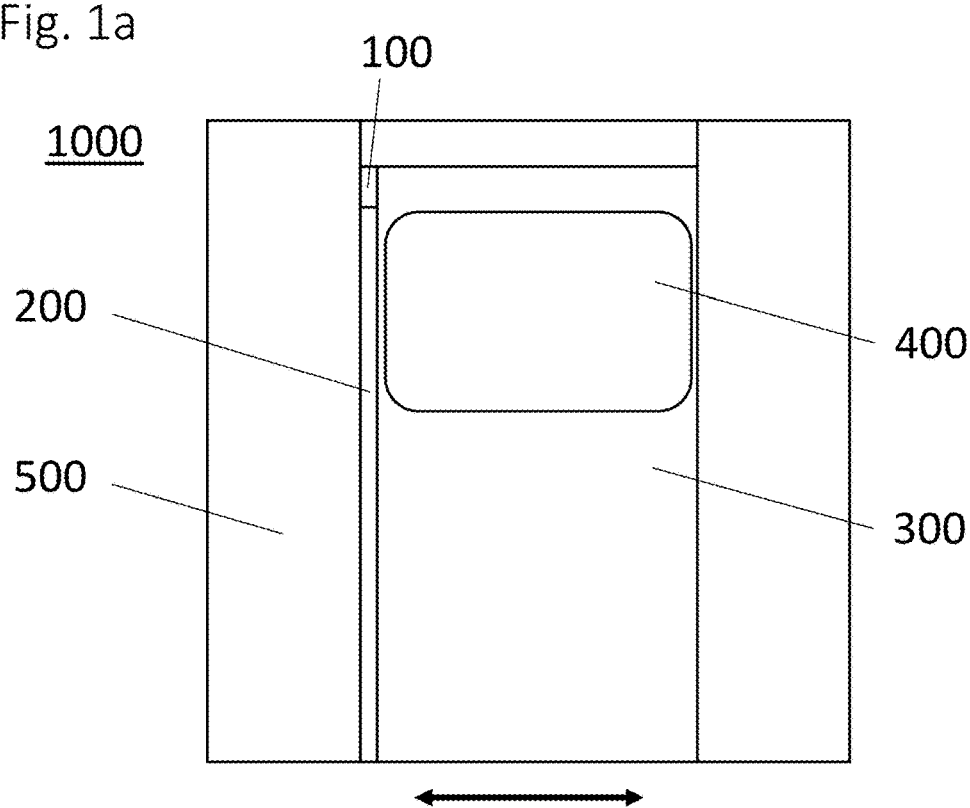

| | | | | |
|---|---|---|---|---|
| 6,337,549 B1* | 1/2002 | Bledin | | E05F 15/46 |
| | | | | 318/449 |
| 6,525,659 B2* | 2/2003 | Jaffe | | E05F 15/73 |
| | | | | 49/28 |
| 6,547,042 B1* | 4/2003 | Collins | | G01V 8/20 |
| | | | | 187/317 |
| 7,044,271 B2* | 5/2006 | De Coi | | B66B 13/26 |
| | | | | 187/316 |
| 8,615,927 B2* | 12/2013 | Ezzat | | G01V 15/00 |
| | | | | 200/61.43 |
| 9,797,178 B2* | 10/2017 | Elie | | E05F 15/77 |
| 10,008,069 B2* | 6/2018 | Elie | | G07F 17/0057 |
| 10,682,903 B1* | 6/2020 | Gandhi | | B60J 10/70 |
| 10,914,110 B2* | 2/2021 | Mitchell | | G01S 13/931 |
| 11,725,434 B2* | 8/2023 | Williams | | E05F 15/43 |
| | | | | 701/49 |
| 2006/0162254 A1* | 7/2006 | Imai | | E05F 15/73 |
| | | | | 340/552 |
| 2007/0261305 A1* | 11/2007 | Kraeutler | | E06B 9/88 |
| | | | | 49/27 |
| 2007/0266635 A1* | 11/2007 | Sugiura | | E05F 15/43 |
| | | | | 49/27 |
| 2010/0325959 A1* | 12/2010 | De Coi | | E05F 15/74 |
| | | | | 49/28 |
| 2012/0085029 A1* | 4/2012 | Stockschlager | | B60J 10/80 |
| | | | | 49/31 |
| 2013/0125467 A1* | 5/2013 | Ezzat | | E05F 15/695 |
| | | | | 318/478 |
| 2015/0315834 A1* | 11/2015 | Collins | | E05F 15/40 |
| | | | | 49/506 |
| 2017/0249797 A1* | 8/2017 | Elie | | G07F 17/0057 |
| 2017/0306684 A1 | 10/2017 | Baruco et al. | | |
| 2018/0245401 A1* | 8/2018 | Van De Wiel | | E05F 15/42 |
| 2018/0321758 A1* | 11/2018 | Serban | | B60J 5/047 |
| 2019/0128040 A1* | 5/2019 | Mitchell | | E05F 15/40 |
| 2019/0309564 A1 | 10/2019 | Mitchell et al. | | |
| 2020/0208459 A1* | 7/2020 | Trobro | | E05F 15/603 |
| 2020/0284876 A1* | 9/2020 | Hurd | | G01S 7/415 |
| 2020/0378172 A1* | 12/2020 | Lerpard | | E05F 15/70 |

* cited by examiner

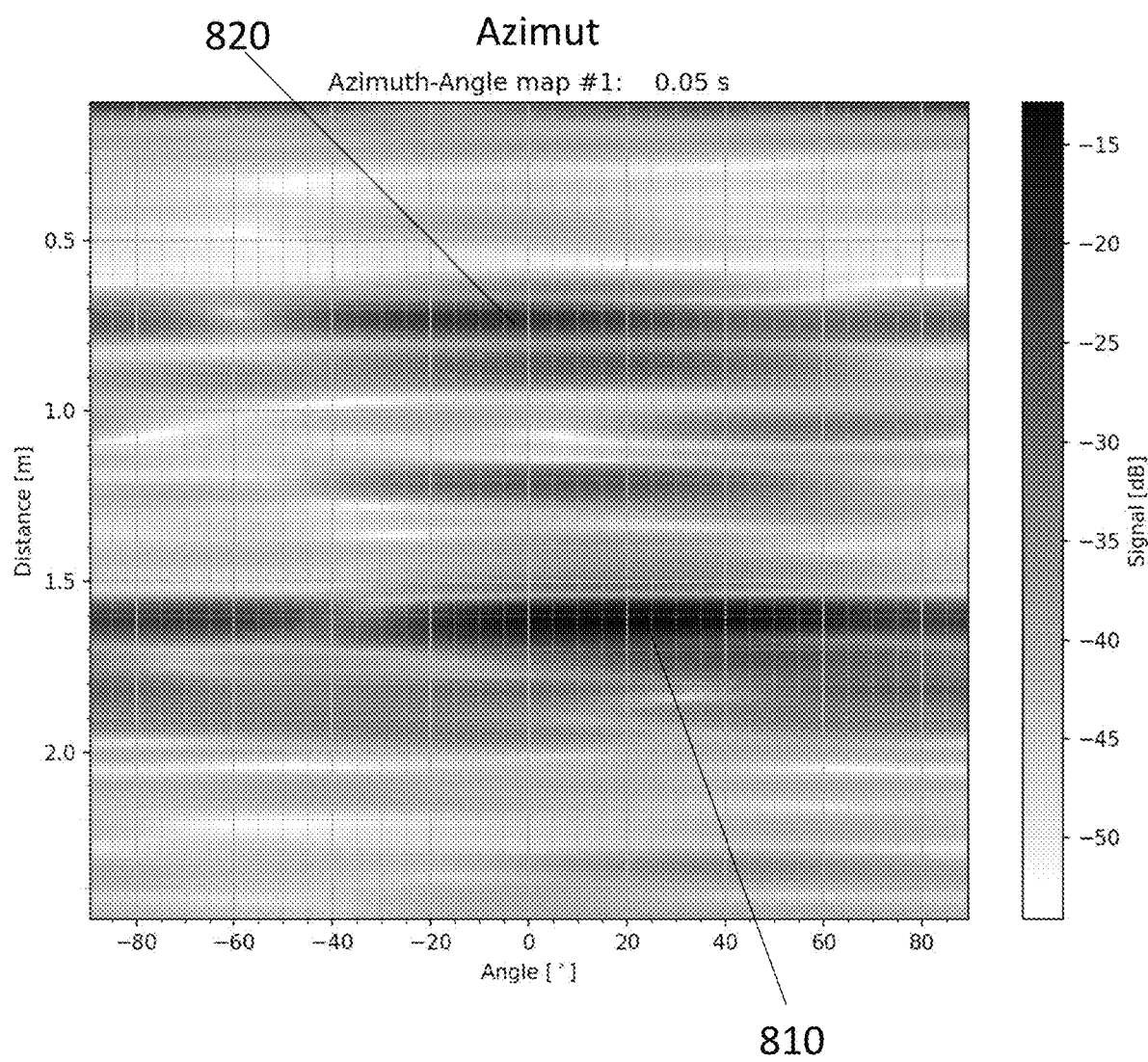

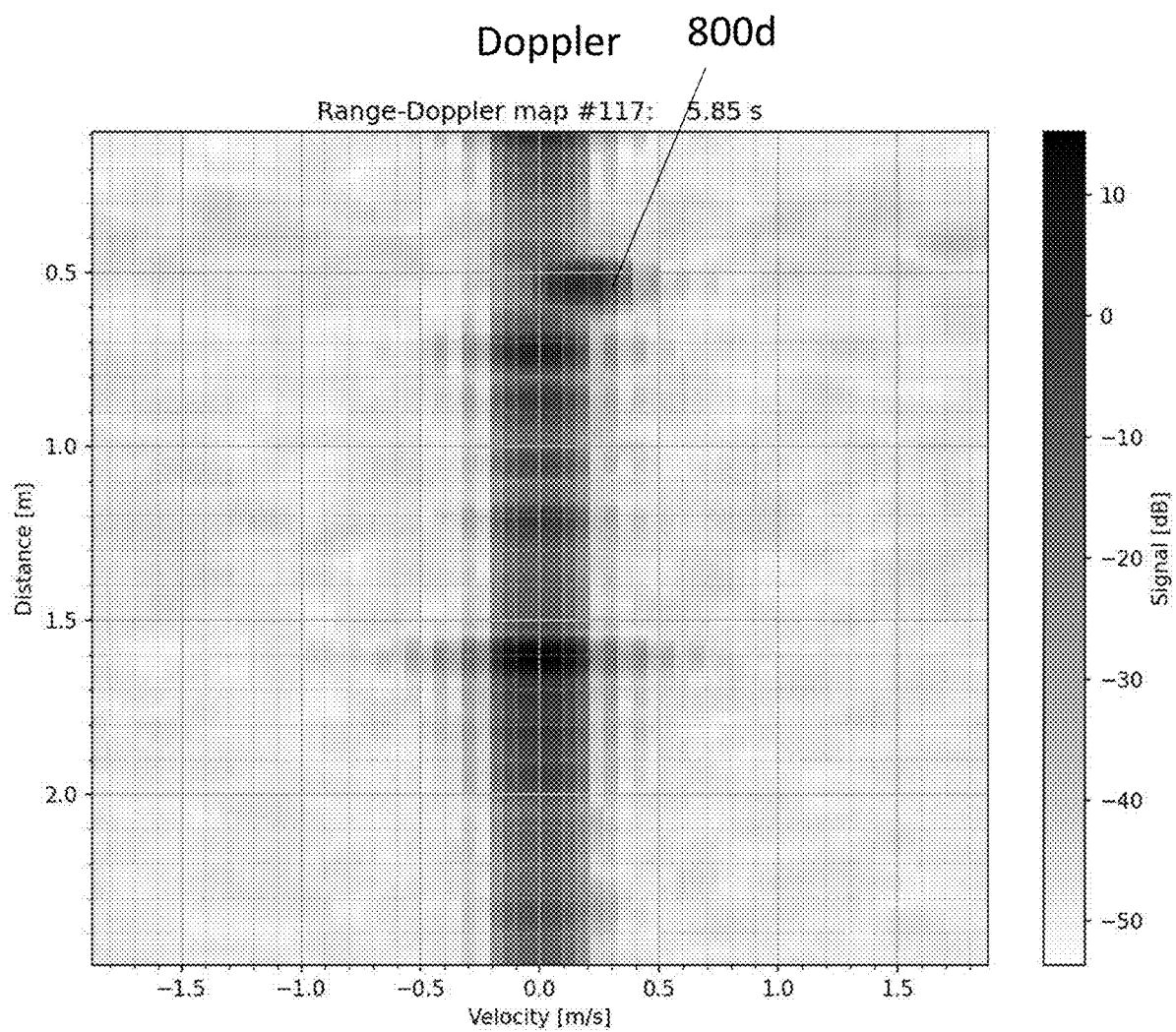

SECURITY STRIP FOR A DOOR AND METHOD OF OPERATING A SECURITY STRIP

CROSS-REFERENCE TO RELATED APPLICATIONS

This application claims priority to European Application Number EP21206246.7 filed Nov. 3, 2021, the disclosure of which is hereby incorporated by reference in its entirety.

TECHNICAL FIELD

The invention concerns a safety strip for a door, in particular for a door of a means of transport. Furthermore, the invention concerns a door with a safety strip and a means of transport with that door. Furthermore, the invention concerns a method for operating a safety element.

TECHNICAL BACKGROUND

Safety strips for doors of means of transport are known from prior art. The safety strips serve as a seal between a door and a frame, or between two doors. Safety strips can also be called profiled safety strips. Furthermore, safety strips can prevent objects, e.g., people or things, from getting caught between the door and the frame, or between two doors, or reduce the probability of getting caught. To this end, safety strips can, e.g., comprise a contact strip that generates a signal when the safety strip is deformed in a predefined way. Such deformation of the safety strip can be caused, e.g., by a person's arm being caught between the closing door and the frame, or between two doors. The signal can be used to stop the further closing of the door to prevent injury to the person.

In addition, the use of light curtain arrangements is known which allow detection of an object between the door and the frame, or between two doors. Frequently, a light curtain arrangement comprises a transmitting unit and a receiving unit. The transmitting unit can be provided in the frame, and the receiving unit can be provided in the door. When reception of the light emitted by the transmitting unit is interrupted by an object, the light curtain arrangement can generate a signal allowing the closing of the door to be stopped.

The detection of objects by means of contact strips and/or light curtain arrangements is limited with respect to several aspects. In addition, in particular the transmitting unit and the receiving unit of the light curtain arrangement are open in the direction of the monitored space, which makes them susceptible to damage, e.g., due to vandalism.

SUMMARY OF THE DISCLOSURE

Therefore, the task of the invention is to provide a safety strip that improves the detection of objects. A further task of the invention is to provide a safety strip that guarantees improved safety. Another further task of the invention is to provide a safety strip that affords protection against damage. Another further task of the invention is to provide a safety strip that can be manufactured and/or exchanged easily and cost efficiently.

At least one of the tasks is solved by the items of the independent claims. Further embodiments of the invention are defined in the dependent claims.

Shown is a safety strip for a door, preferably for a door of a means of transport. The safety strip is elastic and/or flexible. The safety strip has at least one receiving space. The safety strip comprises a sensor arrangement. The sensor arrangement is set up to emit electromagnetic radiation into a monitored area and to receive such radiation from the monitored area. The sensor arrangement is arranged in the receiving space in such a way that the safety strip completely encloses the sensor arrangement at least in one plane.

The emission of electromagnetic radiation into the monitored space and the reception of electromagnetic radiation that exits from the monitored space allow good monitoring of the monitored space, and detection of objects within the monitored space is improved. The sensor arrangement can be arranged in the receiving space in such a way that it is protected. Furthermore, the sensor arrangement can be affixed simply to a door, e.g., to a door of a means of transport. To do this, it is only necessary to replace the safety strip of the door. This provides a simple and cost-efficient way to retrofit existing doors.

The safety strip can be non-rigid, flexible and/or elastic. In particular, the safety strip is designed as a profile, and is provided as a profiled safety strip. The safety strip can contribute to a sealing between the door and a frame, or between the door and a further door, or effect such sealing.

The safety strip can be intended for use on a movable element. For example, the safety strip is intended for use on a door or a window.

In general, the door can be a plug door, a revolving door, a folding door, a sliding door, a sliding plug door, an internal swing door or an external plug door. Likewise, the door can be set up for a building, or be installed in a building.

The means of transport can generally be a vehicle, preferably a commercial vehicle or a passenger vehicle. The means of transport can be a passenger car, a motor truck, a bus, a self-driving vehicle or shuttle, or a train. The means of transport can be an elevator, an airplane, or a cabin, e.g., a ropeway cabin.

The safety strip can be set up to detect at least one object, e.g., a person or a thing, within the monitored space. Alternatively, or in addition, the safety strip can be set up to generate a signal when an object is detected in the monitored space. Based on the signal, e.g., a control of the door can be changed.

The monitored area or the monitored space can be an entrance and/or an exit area or space. The monitored area can, at least partly, be located within a means of transport and/or outside of a means of transport. The monitored area can have a volume of at least $0.01$ m$^3$, preferably at least $0.1$ m$^3$, preferably at least $0.5$ m$^3$, preferably at least $1.0$ m$^3$.

The monitored area can extend perpendicular to a plane defined by the door over a distance of at least 0.1 m, preferably at least 0.5 m, preferably at least 1.0 m, preferably at least 2.0 m, preferably at least 3.0 m.

The sensor arrangement can be a (single) unit. For example, the sensor arrangement can include a housing. All components of the sensor arrangement can be arranged within the housing. All components of the sensor arrangement can be arranged in the receiving space of the safety strip. The sensor arrangement can be a sensor.

The safety strip can be made of (only) one material. Alternatively, the safety strip can be made of several materials, e.g., of at least two different materials, or of at least three different materials. The safety strip can include an elastomer or a rubber. The safety strip can be made of an elastomer or a rubber. The safety strip can include, or be made of, different elastomers or different rubbers. For example, the safety strip can include, or be made of, silicone or an EPDM.

The safety strip can be opaque at least in sections, in particular entirely. The safety strip can be impervious to light in a wavelength range visible to humans (approx. 380 nm to approx. 780 nm) at least in sections, in particular entirely. For example, the safety strip is black. The safety strip can include a color additive, preferably carbon.

The safety strip can be produced, or be producible, by means of extrusion or coextrusion.

The sensor arrangement can emit electromagnetic radiation into the monitored area, the electromagnetic radiation can be reflected in the monitored area, e.g., by objects in the monitored space, and the reflected electromagnetic radiation can be received by the sensor arrangement. Due to the electromagnetic radiation, in particular due to the electromagnetic radiation received or reflected, the sensor arrangement can determine whether an object is located within the monitored area.

In general, the electromagnetic radiation can also be referred to as electromagnetic waves.

The electromagnetic radiation can be transmitted through the safety strip. Alternatively, or in addition, the electromagnetic radiation can be received through the safety strip. The electromagnetic radiation can pass through the material of the safety strip when it is received and/or transmitted.

The sensor arrangement can be arranged in the receiving space in such a way that the electromagnetic radiation passes through the safety strip, or the material of the safety strip, preferably if the electromagnetic radiation is received and/or transmitted through the sensor arrangement.

The sensor arrangement can be arranged in the receiving space in such a way that at least 25% of the surface of the sensor arrangement are enclosed by the safety strip, or the material of the safety strip. Preferably, the sensor arrangement is arranged in the receiving space in such a way that at least 35%, preferably at least 50%, more preferably at least 60%, more preferably at least 75%, more preferably at least 90%, more preferably at least 95%, more preferably at least 97%, more preferably at least 99% of the surface of the sensor arrangement are enclosed by the safety strip, or the material of the safety strip.

The sensor arrangement can be enclosed by at least one section of the safety strip, or of a material of the safety strip, through which electromagnetic radiation passes to be received and/or transmitted by the sensor arrangement.

The plane in which the sensor arrangement is completely enclosed by the safety strip can be oriented perpendicular to a plane that is defined by the door. The safety strip can completely enclose the sensor arrangement in multiple planes, e.g., in at least two planes, at least three planes, at least five planes, or at least ten planes. The multiple planes can be in parallel to each other, and the distance between them can preferably be at least 1 mm, 5 mm, or 10 mm. Alternatively, the multiple planes can be not in parallel to each other, and the angle between any two of the planes can be 5°, 10°, or 20°.

The safety strip, or the material of the safety strip, can essentially completely enclose the sensor arrangement. Due to the "essentially", one or more of the data lines and/or power supply lines and/or the signal line can be excluded. The safety strip, or the material of the safety strip, can completely enclose the sensor arrangement, possibly with the exclusion of data lines, signal line and/or power supply lines. This means that data lines, signal line and/or power supply lines need not be (completely) enclosed by the safety strip if the sensor arrangement is completely enclosed by the safety strip.

The receiving space can be designed as a channel. The receiving space can be open at not more than two sides, preferably at not more than one side. An opening, or more than one opening, of the receiving space can be closed by a closing element.

The sensor arrangement can be a radar sensor arrangement. Radar stands for radio detection and ranging.

The sensor arrangement can be a continuous wave radar or a continuous wave radar sensor arrangement. The continuous wave radar can be modulated or unmodulated. Preferably, the sensor arrangement is an FMCW radar sensor arrangement or a CW radar sensor arrangement. FMCW stands for frequency modulated continuous wave. CW stands for continuous wave. The sensor arrangement can be set up to operate on the basis of FMCW or CW.

The sensor arrangement can be an M-sequence radar sensor arrangement. The sensor arrangement can be set up to operate on the basis of M-sequence.

The sensor arrangement can be a pulse modulation radar sensor arrangement. The sensor arrangement can be set up to operate on the basis of pulse modulation.

The sensor arrangement can be set up to emit radio-frequency electromagnetic radiation into the monitored area and/or to receive such radiation from the monitored area.

The frequency of the electromagnetic radiation can be between 30 kHz and 3000 GHz. Preferably, the frequency of the electromagnetic radiation is between 1 MHz and 3000 GHz, more preferably between 1 MHz and 300 GHz, more preferably between 6 MHz and 300 GHz, more preferably between 1 GHz and 300 GHz, more preferably between 59 GHz and 62 GHz. The frequency of the electromagnetic radiation can be between 1 GHz and 40 GHz.

The sensor arrangement can be set up to emit electromagnetic radiation into the monitored area with a power of less than 1.0 W. Preferably, the sensor arrangement is set up to emit electromagnetic radiation into the monitored area with a power of less than 100 mW, more preferably of less than 10 mW, more preferably between 0.1 mW and 10 mW, more preferably between 1 mW and 10 mW.

The sensor arrangement can be set up to emit and/or receive electromagnetic radiation within an ISM band (ISM: industrial, scientific, and medical band). An ISM band can be a frequency range that can be used by high-frequency units in industrial, scientific, medical, domestic and/or similar environments without a license, and in most cases without the need of approval.

The sensor arrangement can have at least one antenna. The antenna can be set up to emit electromagnetic radiation into the monitored area and/or to receive such radiation from the monitored area. Preferably, the antenna is set up to emit electromagnetic radiation into the monitored area and/or to receive such radiation from the monitored area.

The sensor arrangement can comprise at least a first antenna and at least a second antenna. The first antenna can be set up to emit electromagnetic radiation into the monitored area. The second antenna can be set up to receive electromagnetic radiation from the monitored area. The sensor arrangement can comprise at least a first antenna and at least two second antennae.

Preferably, the sensor arrangement comprises three antennae that are set up to emit electromagnetic radiation into the monitored area. Alternatively, or in addition, the sensor arrangement can comprise four antennae that are set up to receive electromagnetic radiation from the monitored area.

Each of the antennae can be set up to emit and receive electromagnetic radiation. Preferably, emission and reception have a time offset or a time lag. Alternatively, each of the antennae can be set up to only (i.e., exclusively) emit, or to only (i.e., exclusively) receive electromagnetic radiation. For example, first antennae can be set up to only (i.e., exclusively) emit electromagnetic radiation. Second antennae can be set up to only (i.e., exclusively) receive electromagnetic radiation.

The sensor arrangement can comprise at least two antennae that are set up to emit electromagnetic radiation. The two antennae can be arranged at a distance to one another within the sensor arrangement. The distance (also called transmitting antenna distance) can be between 0.6 and 1.5, preferably between 0.7 and 1.4, more preferably between 0.8 and 1.3, more preferably between 0.9 and 1.1, more preferably between 0.95 and 1.05, more preferably 1.0 times the wavelength of the electromagnetic radiation. The sensor arrangement can comprise at least three antennae that are set up to emit electromagnetic radiation. The transmitting antenna distance can be present between the first of the three antennae and the third of the three antennae. Alternatively, or in addition, the transmitting antenna distance can be present between the second of the three antennae and the third of the three antennae.

The sensor arrangement can comprise at least two antennae that are set up to receive electromagnetic radiation. The two antennae can be arranged at a distance to one another within the sensor arrangement. The distance (also called receiving antenna distance) can be between 0.1 and 0.9, preferably between 0.2 and 0.8, more preferably between 0.3 and 0.7, more preferably between 0.4 and 0.6, more preferably between 0.45 and 0.55, more preferably 0.5 times the wavelength of the electromagnetic radiation. The sensor arrangement can comprise at least four antennae that are set up to emit electromagnetic radiation. The receiving antenna distance can be present between the first of the four antennae and the third of the four antennae. Alternatively, or in addition, the receiving antenna distance can be present between the third of the four antennae and the fourth of the four antennae. Alternatively, or in addition, the receiving antenna distance can be present between the fourth of the four antennae and the second of the four antennae. Alternatively, or in addition, the receiving antenna distance can be present between the second of the four antennae and the first of the four antennae. The receiving antenna distance can be present in each case between any two of the four antennae.

The safety strip can have a fastening section. The safety strip can be connectable to the door non-positively and/or positively by means of the fastening section. The safety strip can be detachably connectable to the door.

The door can have a fastening receiver. The fastening receiver can be designed in such a way that the fastening section of the safety strip can be inserted into the fastening receiver to connect the safety strip to the door non-positively and/or positively.

The safety strip can comprise a contact strip, in particular an electrical contact strip. Alternatively, or in addition, the safety strip can comprise a light curtain arrangement.

The contact strip can output a contact signal that is used to control the light source. The contact strip can be arranged in a contact area of the safety strip with a frame, or in the contact area of the safety strip with another door. In this way, mechanical contact with the other door, the frame, or an object can easily be detected. The contact strip is preferably arranged in an enclosed hollow space, or receiving space, of the safety strip that causes output of the contact signal by the contact strip when that space is elastically deformed.

The light curtain arrangement can be set up to detect an object in the monitored area. The monitored area can be identical or different to the monitored area of the sensor arrangement. The light curtain arrangement can be set up to emit light, in particular light not visible to humans, into the monitored area and/or to receive such light from the monitored area. The light curtain arrangement can be arranged in a hollow space or a receiver in the safety strip.

The sensor arrangement, the contact strip and/or the light curtain arrangement can be linked to a door control system. The sensor arrangement, the contact strip and/or the light curtain arrangement can each be set up to generate a signal and transmit the signal to the door control system. Based on the one, or the multiple, signals, the control of the door, in particular the movement of the door, can be changed.

The length of the safety strip can be a multiple of its width. The multiple can be at least two, preferably at least five, more preferably at least ten, more preferably at least twenty. The sensor arrangement can be arranged at a distance of not more than 40%, preferably not more than 35%, more preferably not more than 30%, more preferably not more than 25%, more preferably not more than 20%, more preferably not more than 15%, more preferably not more than 10%, more preferably not more than 5% of the total length of the safety strip in longitudinal direction from an end of the safety strip. The longitudinal direction can extend along the lengthwise direction.

The safety strip can have a length of at least 0.5 m, preferably at least 1.0 m, more preferably at least 1.5 m, more preferably at least 2.0 m, 2.5 m.

Usually, the safety strip is installed, or installable, vertically (in the direction of gravitation) at the door. The sensor arrangement can be arranged in an upper area. A distance to the upper end of the safety strip can be no more than 40%, preferably not more than 35%, more preferably not more than 30%, more preferably not more than 25%, more preferably not more than 20%, more preferably not more than 15%, more preferably not more than 10%, more preferably not more than 5% of the total length of the safety strip.

The sensor arrangement can emit the electromagnetic radiation downward (in the direction of gravitation). Emission can be at an angle to the downward direction.

The safety strip can comprise a controller. The controller can be a control and/or evaluation unit. The controller can be set up to determine, on the basis of the electromagnetic radiation received, whether at least one object is located within the monitored area. In particular, the sensor arrangement includes the controller.

Alternatively, the controller can be arranged outside of the safety strip. The sensor arrangement can transmit signals to the controller on the basis of the electromagnetic radiation received. Based on the signals, the controller can determine whether an object is located within the monitored area. Transmission can be wireless or wire-bound.

The controller can be set up to edit, to process and/or to evaluate a signal which is based on the electromagnetic radiation received. The signal can comprise, or be, the totality of all variables obtained through the sensor arrangement. For example, the signal can comprise all variables received from the antennae. In particular, one or multiple filters can be applied to the signal. For example, a background signal can be deducted, or subtracted out, by a filter.

The editing may alter the signal. In particular, the signal is altered by the processing for the purpose of (downstream) further processing of the signal, or evaluation of the signal.

The controller can be set up to determine a location and/or a speed and/or a direction of movement of the object on the basis of the electromagnetic radiation received in the monitored area, or based on the edited, processed and/or evaluated signal. The speed can be a relative speed between the sensor arrangement and the object. The location can be ascertainable based on a distance between the sensor arrangement and the object, and a direction. The direction can be determined or defined by a point and one angle or two angles.

Preferably, the sensor arrangement or the controller are set up to determine both the location and the speed of an object located within the monitored space. In addition, the sensor arrangement or the controller can be set up to determine a direction of movement of the object.

The controller can be set up to resolve the signal, which is based on the electromagnetic radiation received, into intermediate information. The intermediate information can comprise a distance, an angle, a speed and/or a signal strength. Likewise, the intermediate information can comprise additional variables, in particular abstracted variables, which enable a classification of objects.

The controller can be set up to classify the object on the basis of the electromagnetic radiation and/or on the basis of the edited, processed and/or evaluated signal. Classes of the classification can include a type, a state and/or a relevance. Each of the classes can be subdivided into at least two subclasses. For example, the "type" class can be subdivided into ["person", "door"]. The "state" class can, e.g., be subdivided into ["moves towards door", "moves away from door", "does not move"]. The "relevance" class can, e.g., be subdivided into ["relevant", "not relevant"].

The controller can be set up to separate the object on the basis of the electromagnetic radiation and/or on the basis of the edited, processed and/or evaluated signal. For example, multiple objects can be identified by the controller on the basis of the electromagnetic radiation and/or on the basis of the edited, processed and/or evaluated signal. The controller can be set up to distinguish or separate the (identified) objects.

The controller can be set up to evaluate or analyze the signal which is based on the electromagnetic radiation received. For example, the controller can be set up to detect or determine or interpret a scenario on the basis of the signal which is based on the electromagnetic radiation received.

Preferably, the controller is set up to interpret the scenario on the basis of the signal, the intermediate information and/or the classification. For example, the controller can be set up to determine whether a person (also called a passenger) is approaching a door that is closing. Doing this, the controller can determine whether the person (probably) will be caught between the door and a frame, or between the door and a further door.

The controller can be set up to generate a signal on the basis of the electromagnetic radiation and/or on the basis of the edited signal and/or on the basis of the classification and/or on the basis of a state of the door. An operation of the door can be alterable due to the signal generated. Preferably, a movement of the door is alterable due to the signal. More preferably, a closing operation of the door is interruptible or abortable due to the signal.

Preferably, the state of the door, in particular the opening and/or closing state of the door, is an influencing variable during generation of the signal. When a person or any other object is moving towards a door that is closing, and the door is wide open, the controller can determine that abortion of the closing operation is not necessary. If, however, the door is open only a little, e.g. because the closing operation is almost completed, the controller can determine that the closing operation is to be aborted, because it is imminent, or there is a threat, that the person will be caught between the door and the frame, or the door and another door.

The controller can be set up to use an algorithm, or multiple algorithms, preferably before the signal is generated. In particular, the controller can be set up to use an algorithm, or multiple algorithms, to evaluate the signal which is based on the electromagnetic radiation. An algorithm can be set up to learn from data. For example, machine learning can be applied to the algorithm. In particular, supervised machine learning, unsupervised machine learning and/or reinforcement learning is applied to the algorithm.

Shown is a method for operating a safety strip for a door, in particular for a door of a means of transport. The safety strip comprises a sensor arrangement that is arranged within a receiving space of the safety strip and is completely enclosed by the safety strip at least in one plane. The method comprises the following steps: Emission, by the sensor arrangement, of electromagnetic radiation into a monitored space; reception, by the sensor arrangement, of electromagnetic radiation from the monitored space; and determination, on the basis of the electromagnetic radiation received, whether an object is located within the monitored space.

Any of the safety strips disclosed herein can be used in the method. In particular, any of the process steps disclosed herein, e.g., any process step for which the controller is set up, can be used in the method.

Shown is a door with a safety strip. The door can comprise any of the safety strips disclosed herein.

The safety strip can be detachably connected to the door. In particular, the safety strip is inserted into the door at least in sections.

The door can be a plug door, a revolving door, a folding door, a sliding plug door, an internal swing door or an external plug door. The door can be an automatic door, preferably a semi-automatic or a fully automatic door. The door can be driven, e.g., by a motor, preferably an electric motor. Likewise, the door can be drivable pneumatically or hydraulically. An opening and/or closing of the door can be effected by means of the drive.

Shown is a door arrangement. The door arrangement can comprise at least two doors.

Shown is a means of transport having at least one door. The means of transport can have two doors. Each of the doors can be any door disclosed herein.

The means of transport can generally be a vehicle, preferably a commercial vehicle or a passenger vehicle. The means of transport can be a passenger car, a motor truck, a bus, or a train. The means of transport can be an elevator, an airplane, or a cabin, e.g., a ropeway cabin.

SHORT DESCRIPTION OF THE FIGURES

In the following, the disclosure, or further embodiments and advantages of the disclosure, are explained in more detail with the help of figures, the figures only describing embodiments of the disclosure. Identical components in the figures have identical reference signs.

Figure 1B:
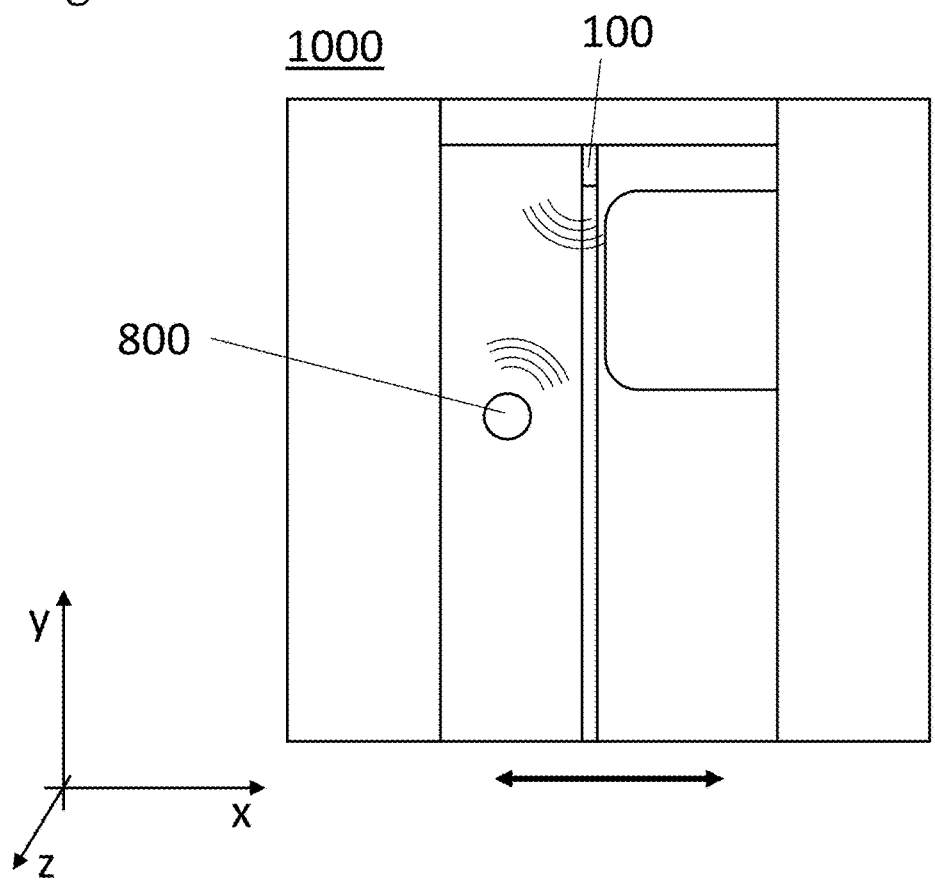
Figure 2A:
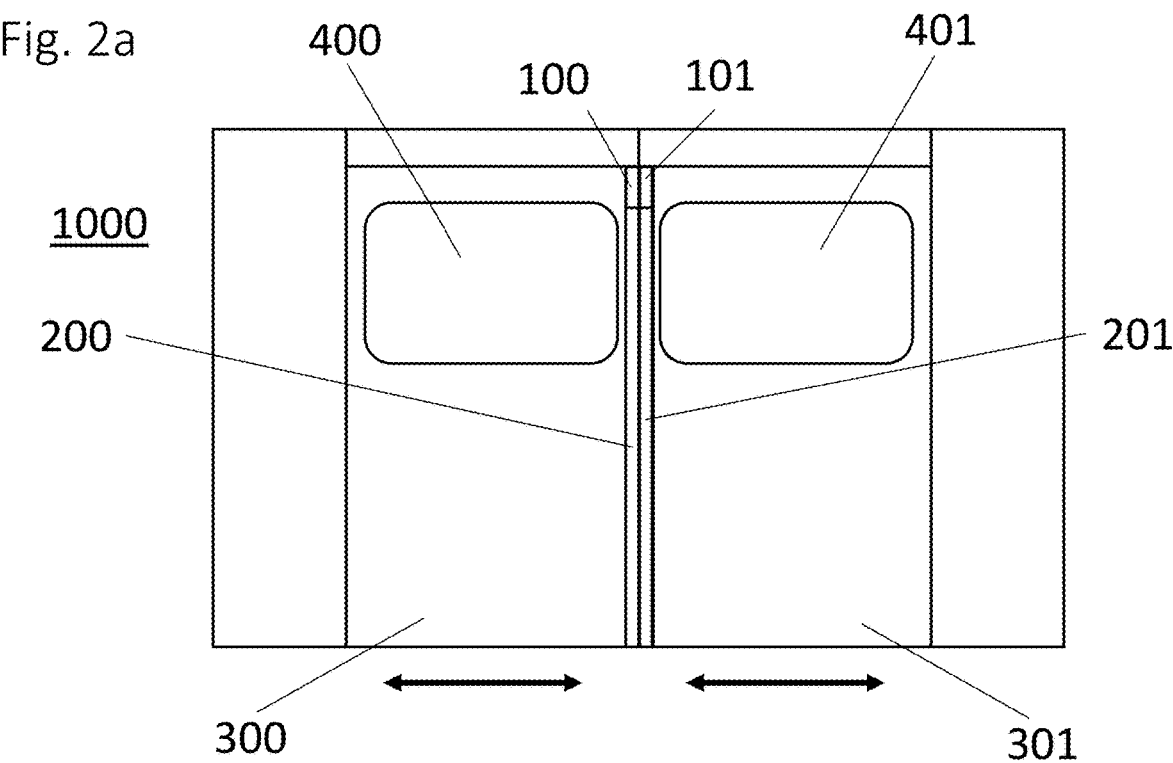
Figure 2B:
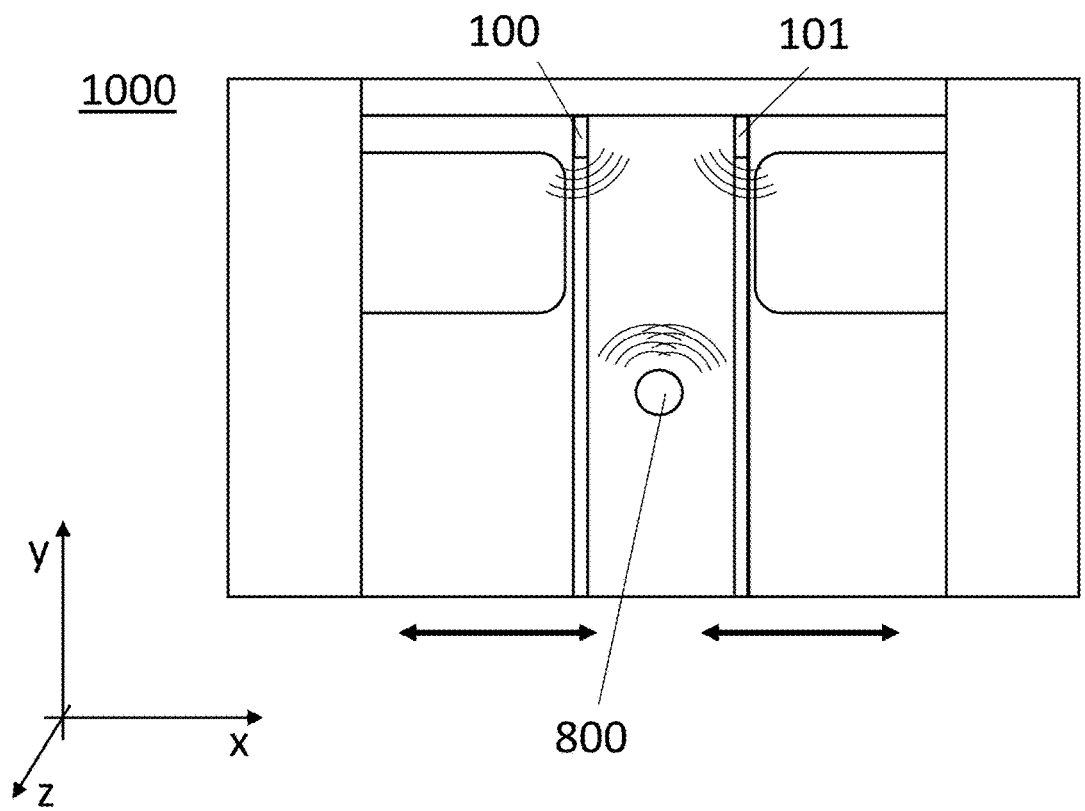
Figure 3A:
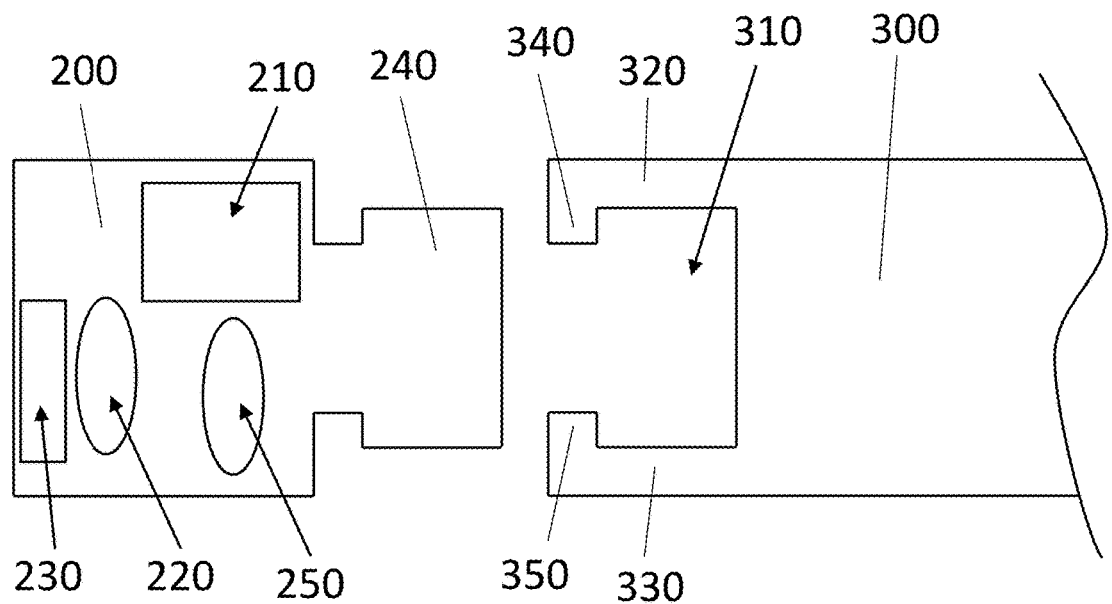
Figure 3B:
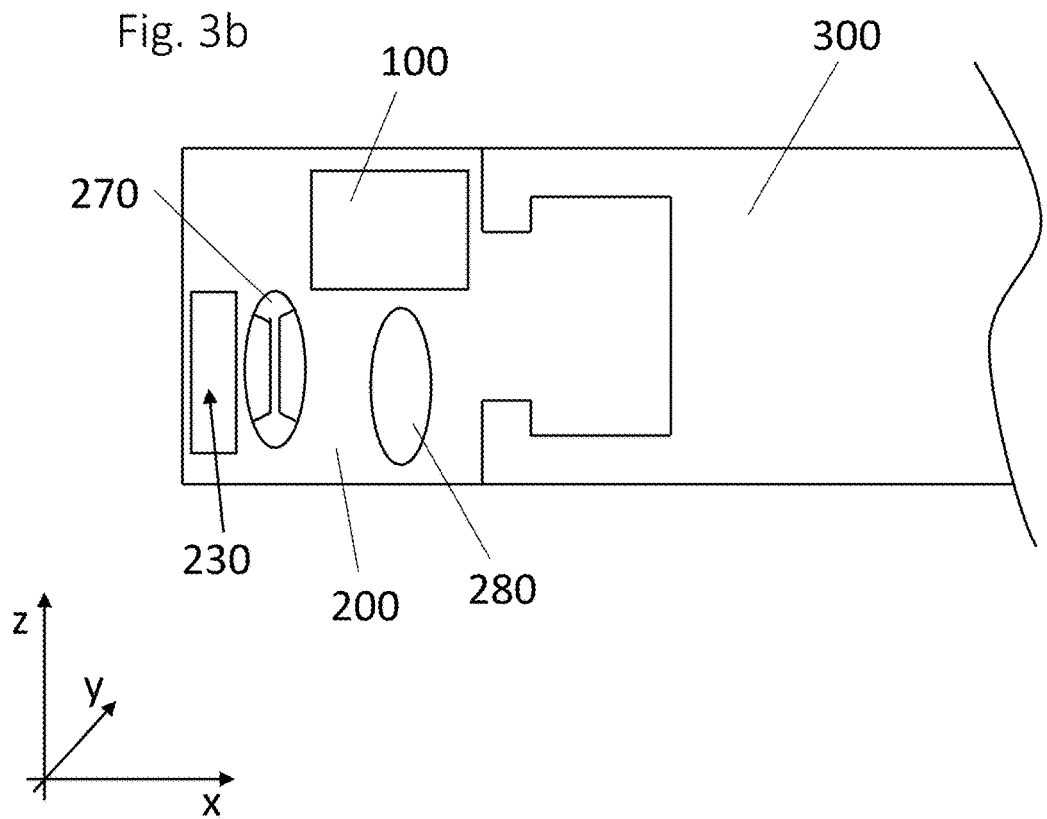
Figure 4:
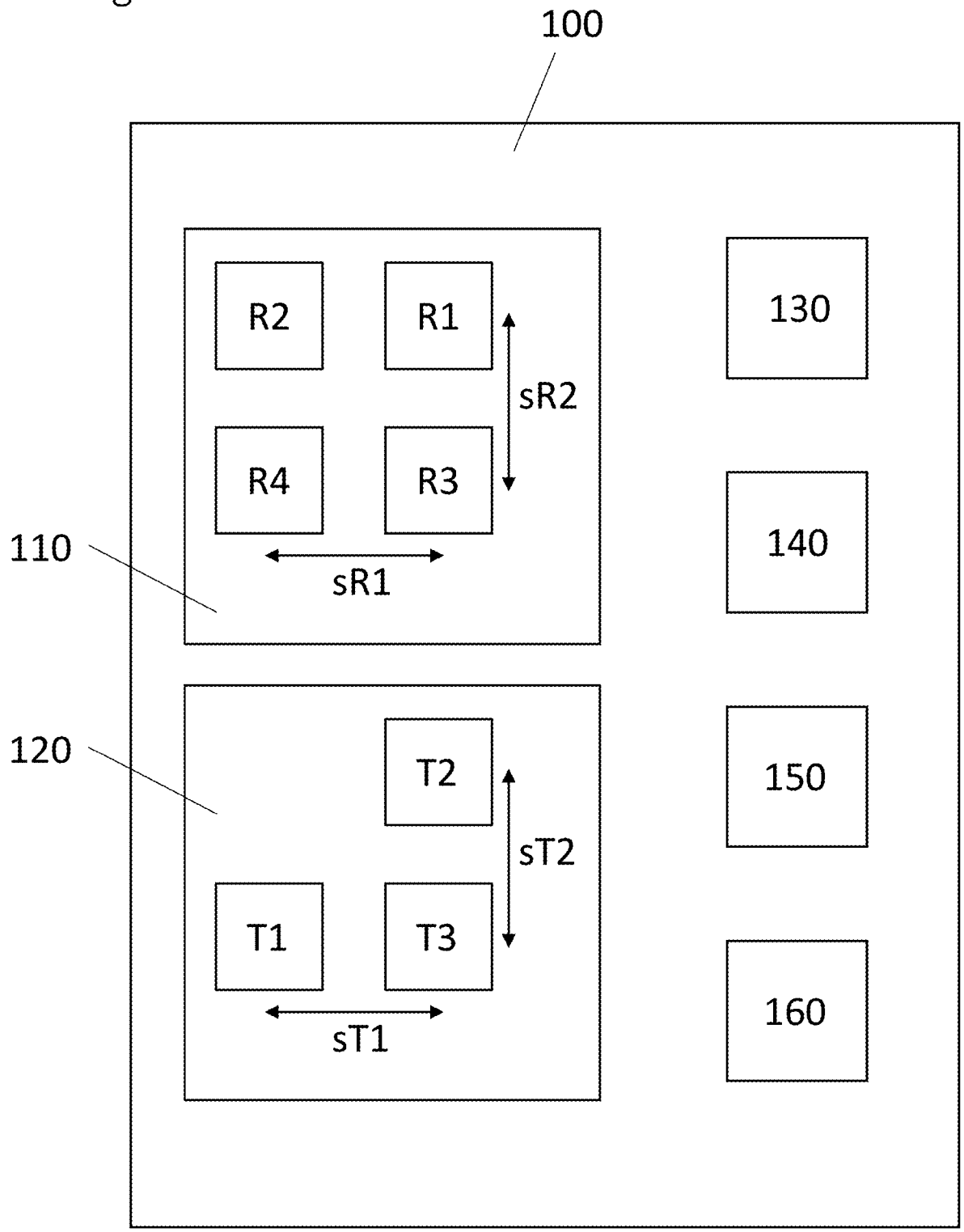
Figure 5A:
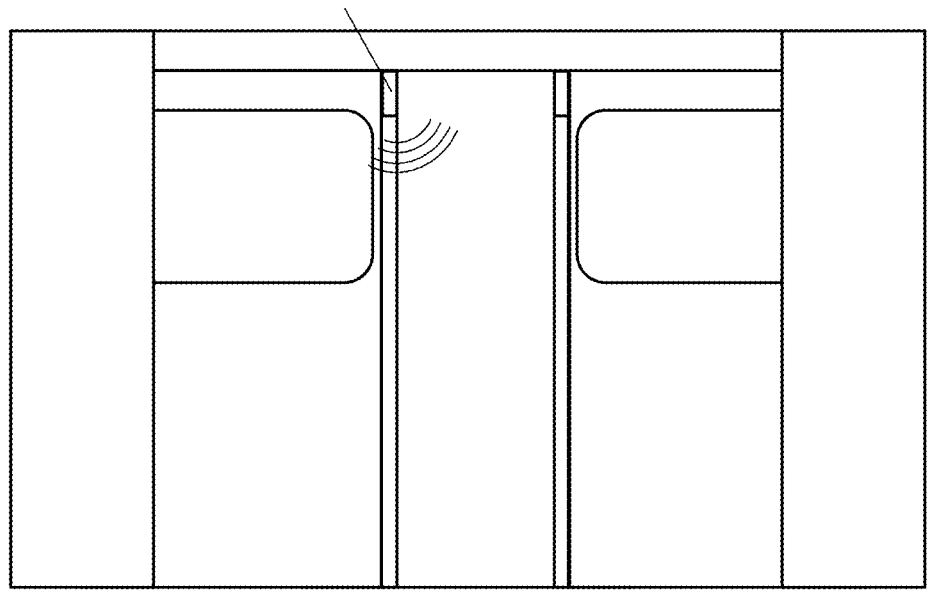
Figure 5C:
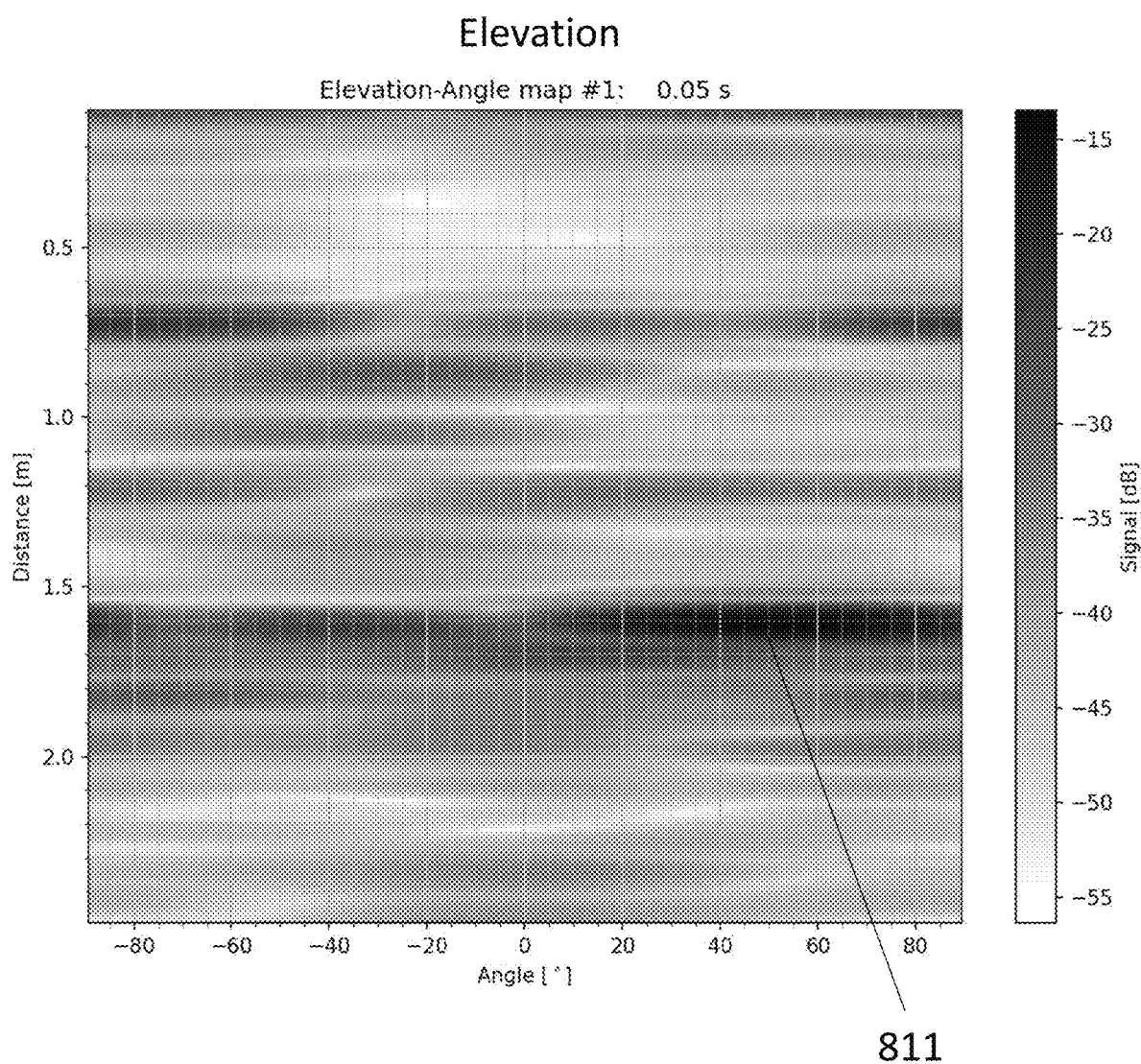
Figure 5D:
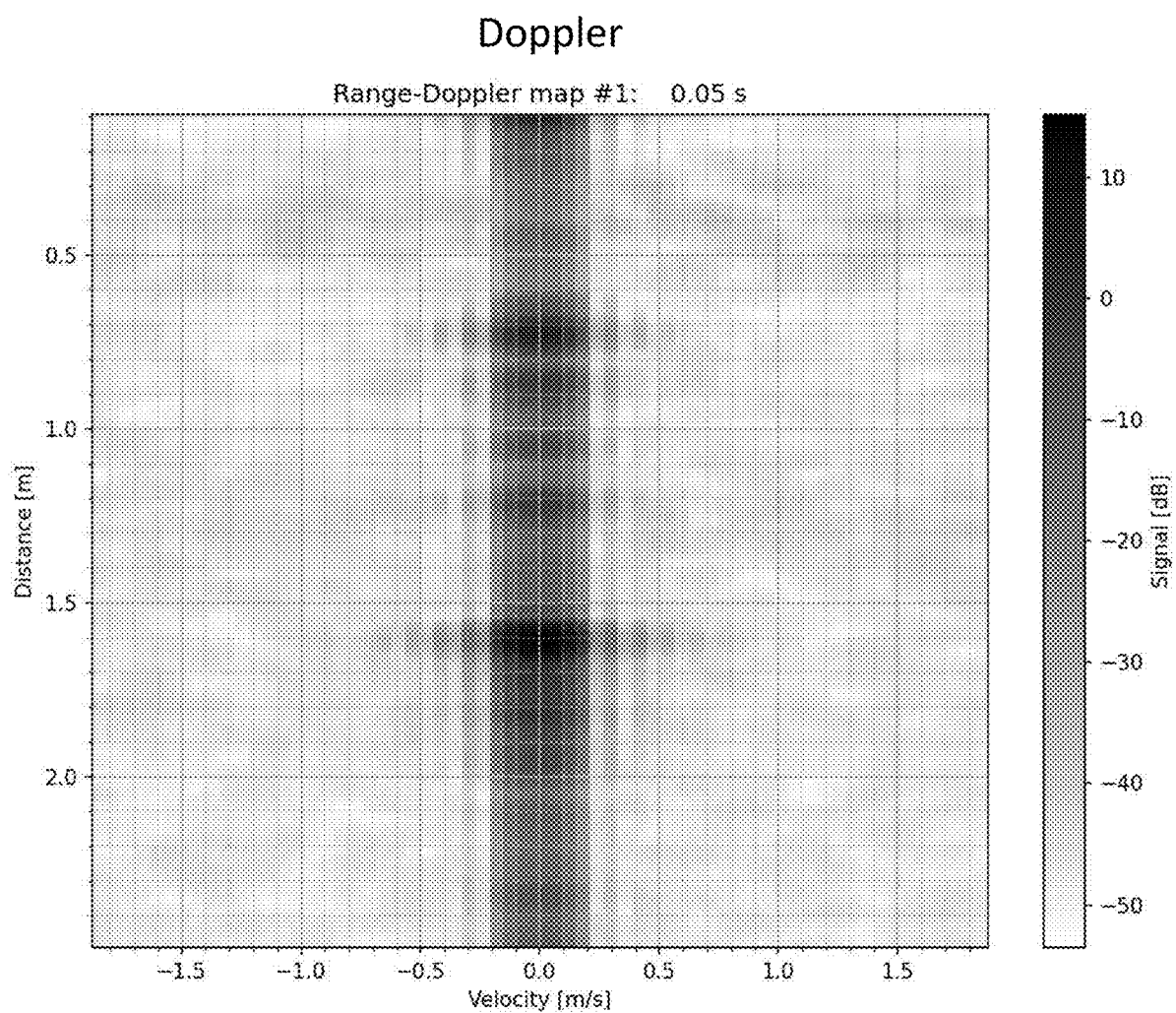
Figure 6A:
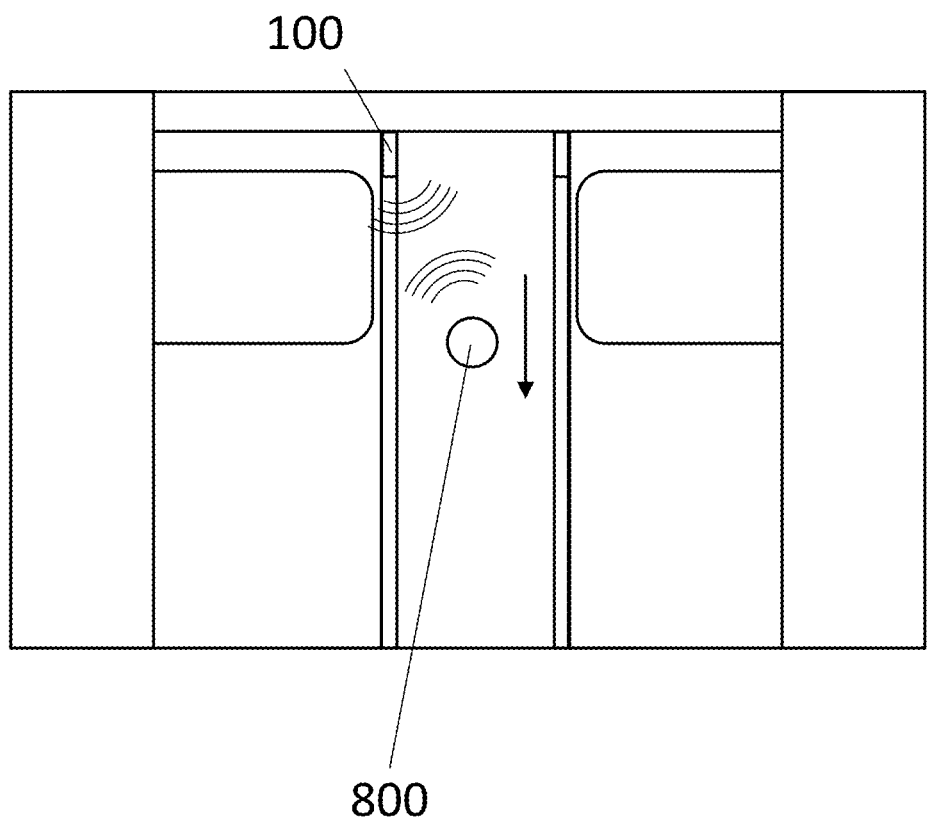
Figure 6B:
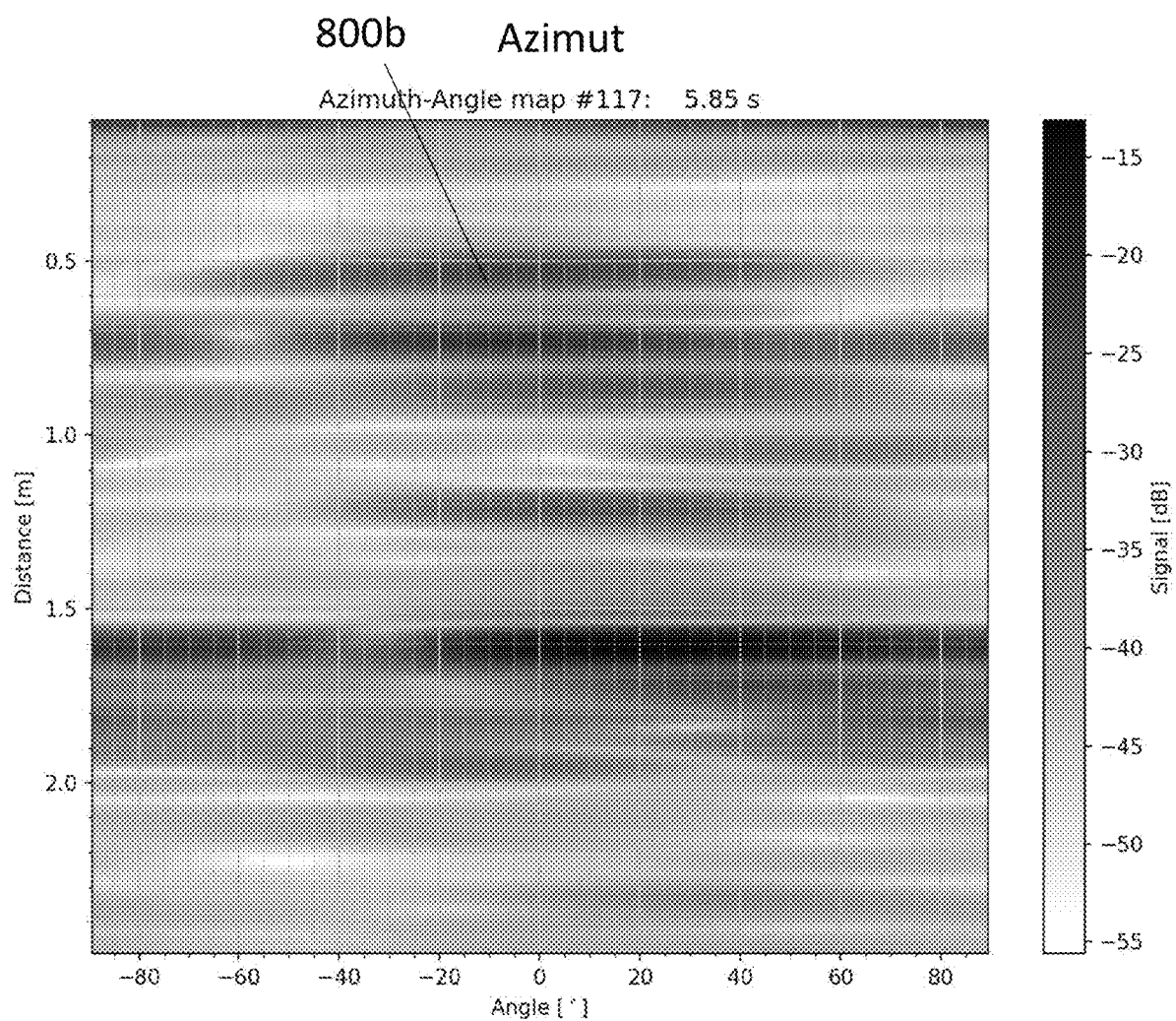
Figure 6C:
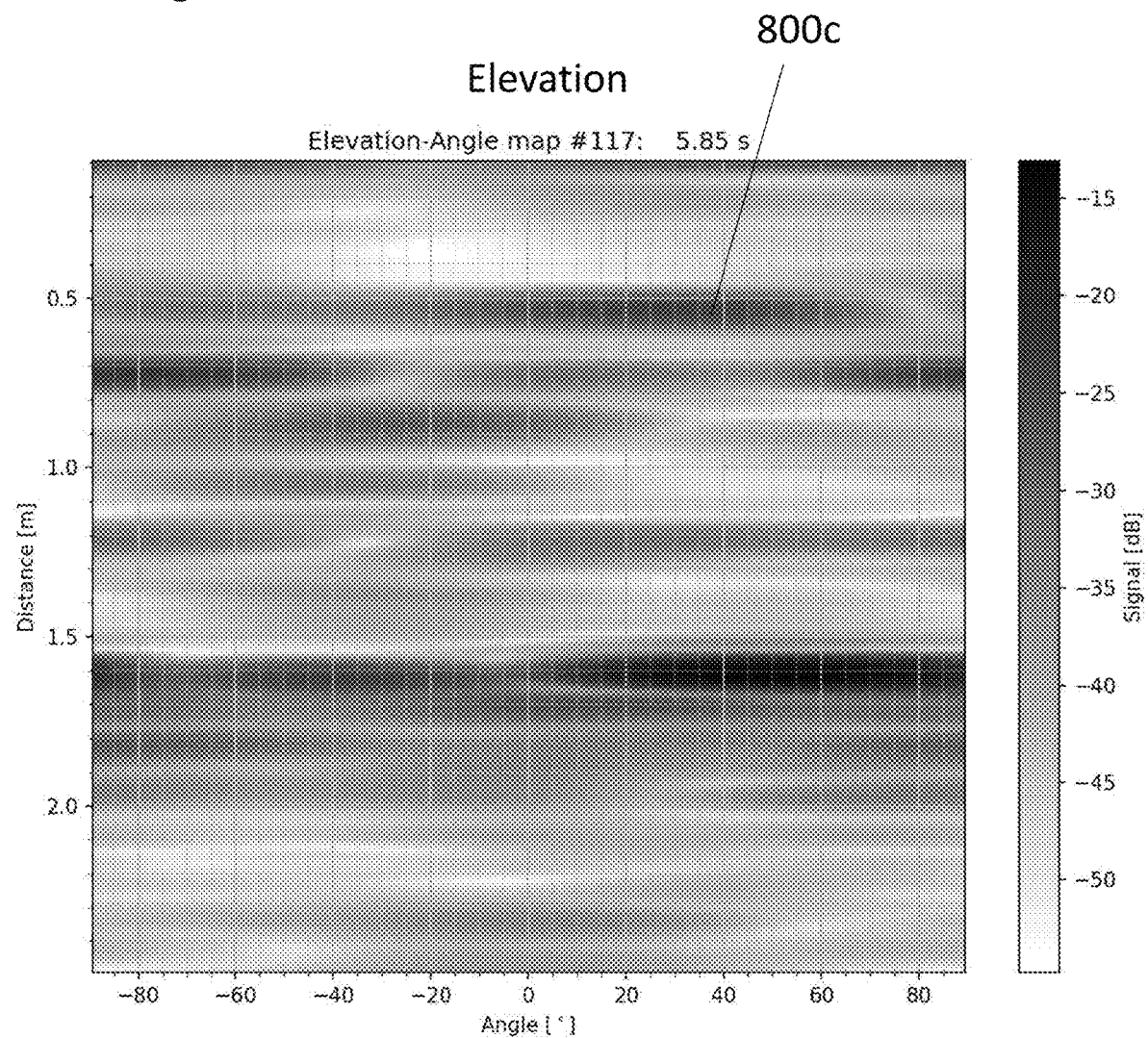
Figure 7A:
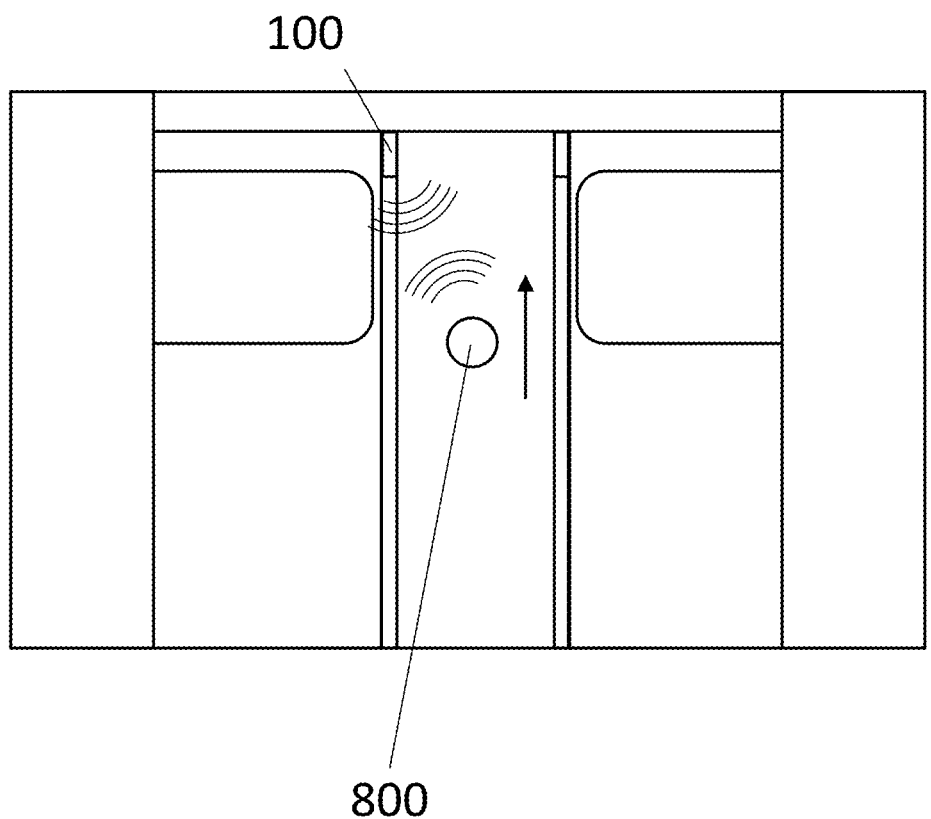
Figure 7B:
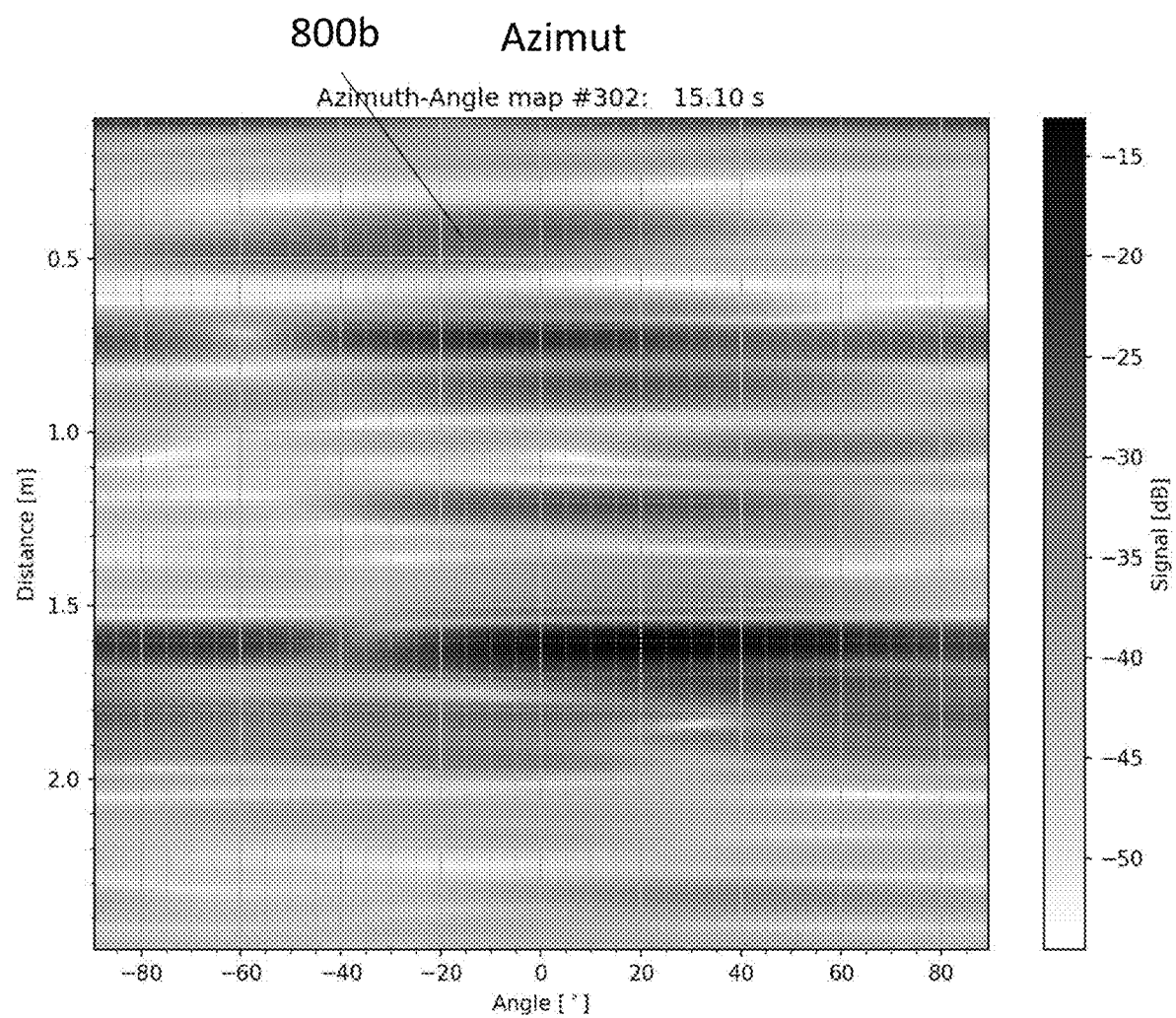
Figure 7C:
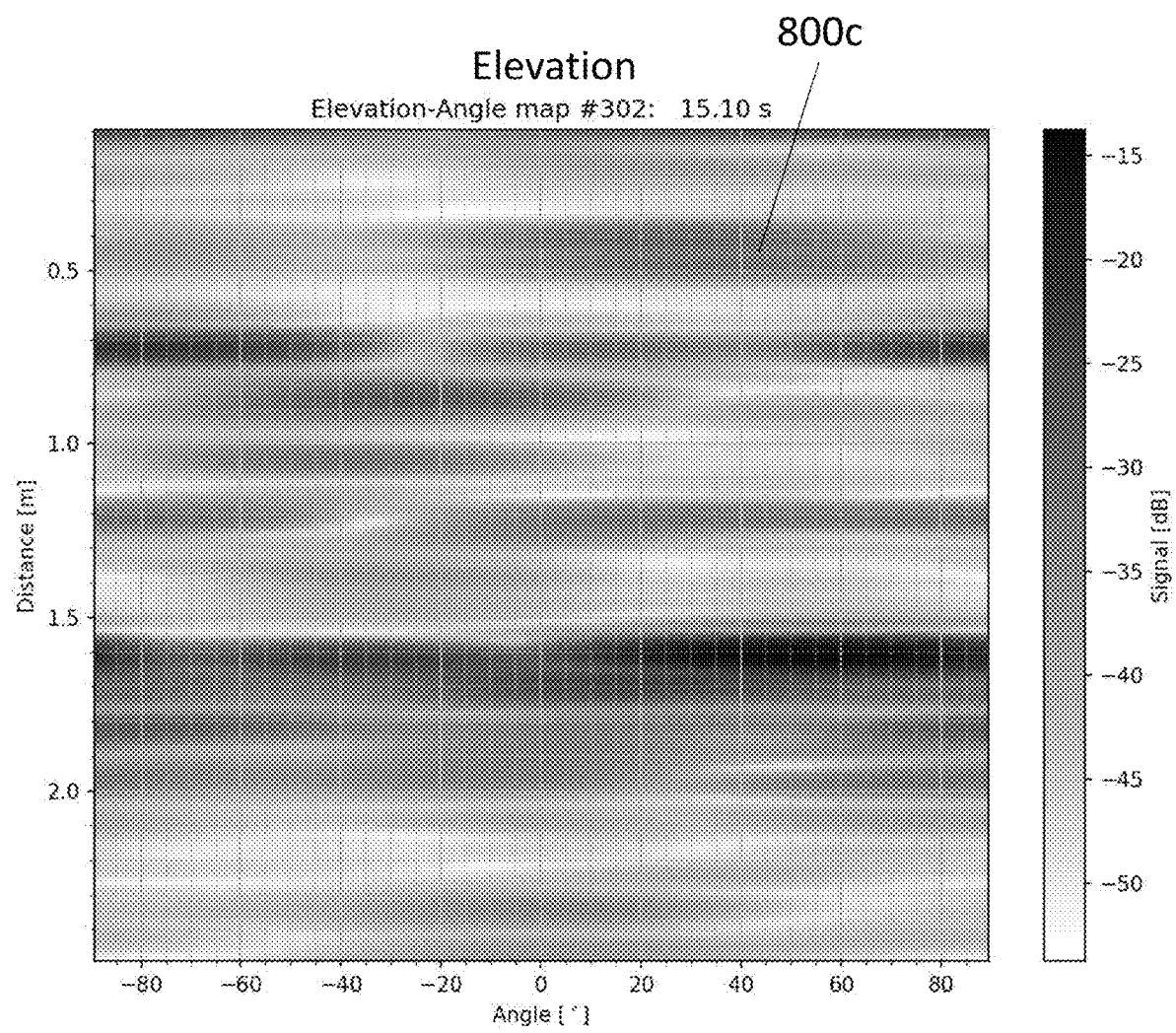
Figure 7D:
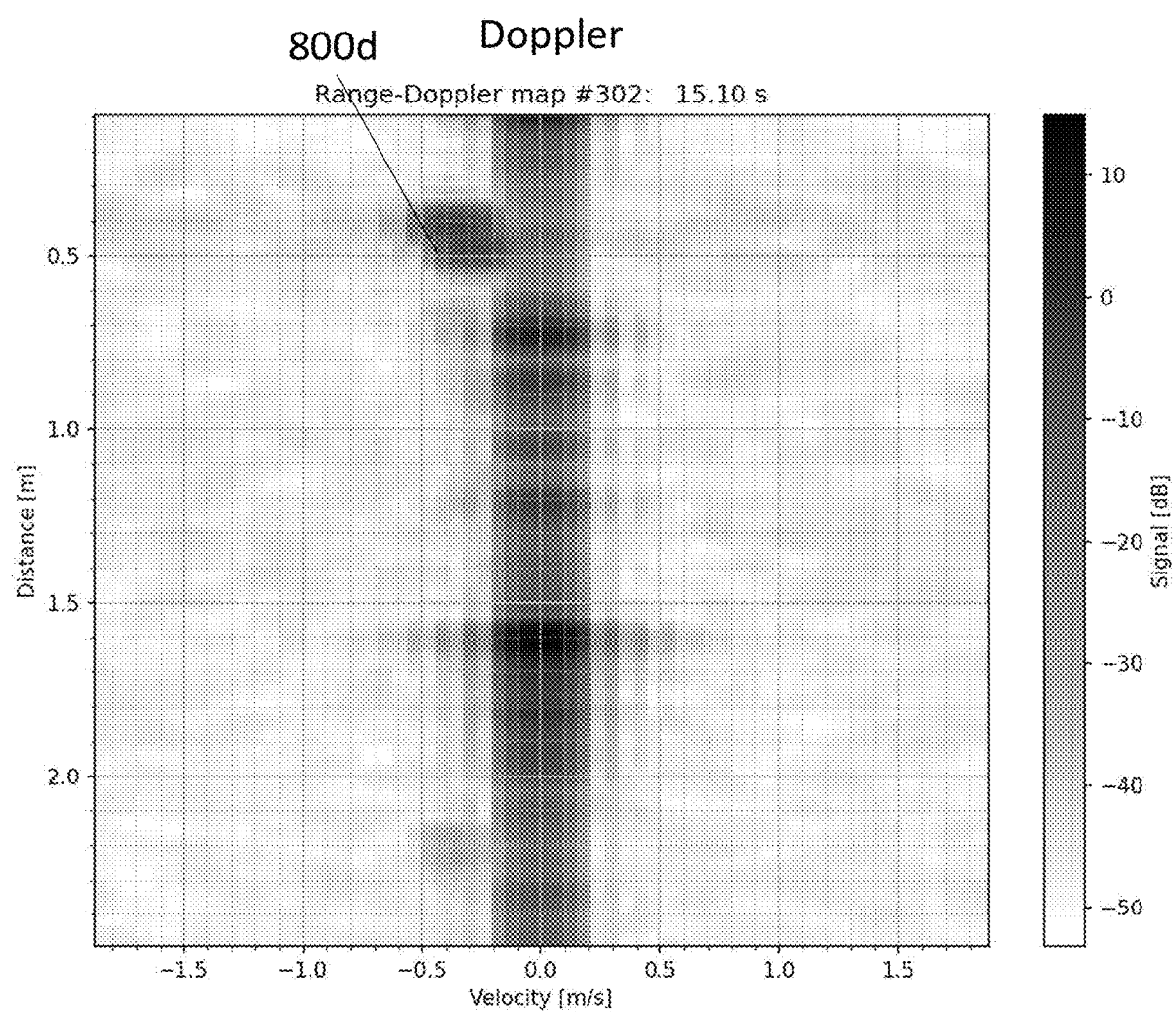
Figure 8A:
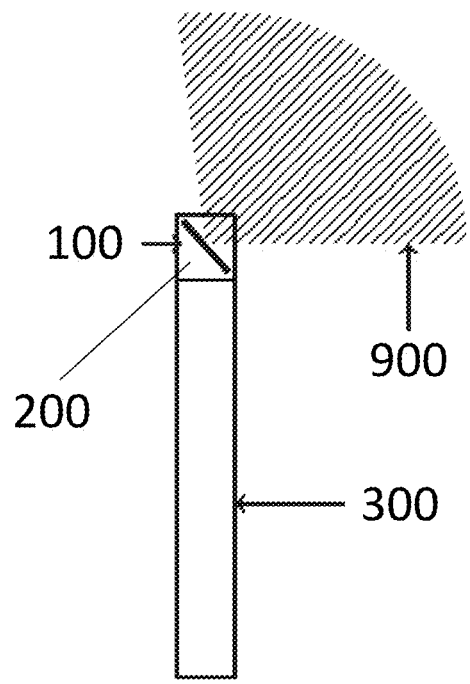
Figure 8B:
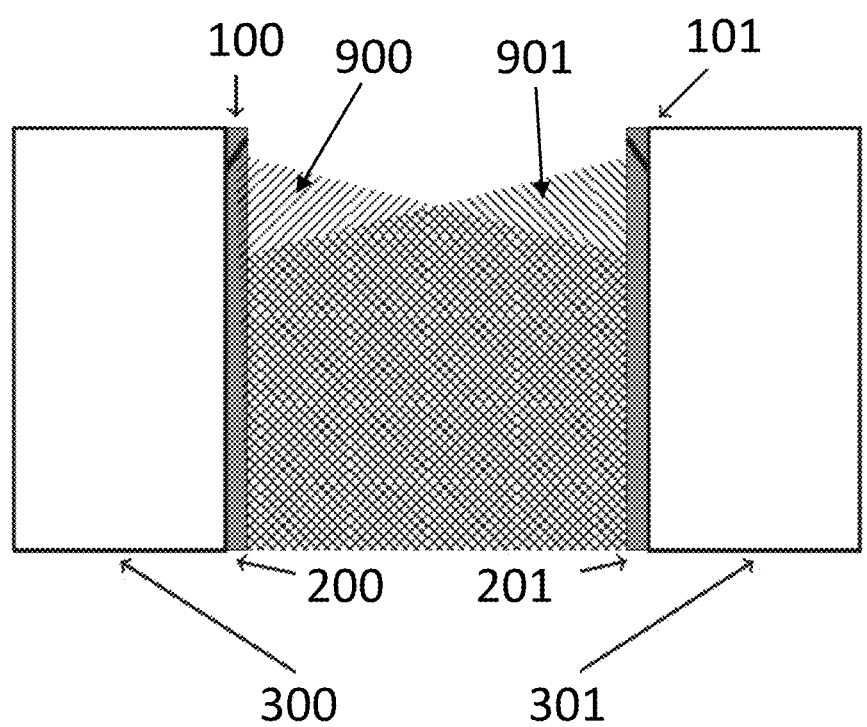

FIG. 1*a* shows a door arrangement in a first state;
FIG. 1*b* shows a door arrangement in a second state;
FIG. 2*a* shows a door arrangement in a first state;
FIG. 2*b* shows a door arrangement in a second state;
FIG. 3*a* shows a safety strip and a door in a non-connected state;
FIG. 3*b* shows the safety strip and the door in a connected state;

FIG. 4 shows a schematic diagram of a sensor arrangement;

FIG. 5a shows a door arrangement in a first state;
FIG. 5b shows a measurement by a sensor arrangement;
FIG. 5c shows a measurement by a sensor arrangement;
FIG. 5d shows a measurement by a sensor arrangement;
FIG. 6a shows a door arrangement in a first state;
FIG. 6b shows a measurement by a sensor arrangement;
FIG. 6c shows a measurement by a sensor arrangement;
FIG. 6d shows a measurement by a sensor arrangement;
FIG. 7a shows a door arrangement in a first state;
FIG. 7b shows a measurement by a sensor arrangement;
FIG. 7c shows a measurement by a sensor arrangement;
FIG. 7d shows a measurement by a sensor arrangement;
FIG. 8a shows a monitored area of a sensor arrangement; and
FIG. 8b shows a monitored area of a sensor arrangement, and a monitored area of a sensor arrangement.

DETAILED DESCRIPTION

FIG. 1a shows a door arrangement 1000 in a first state. The door arrangement 1000 comprises a door 300. The door 300 can be a door of a means of transport, e.g., of a train. The door 300 is a single-leaf design. The door 300 can be designed as a sliding door that closes against a frame 500. The door 300 preferably comprises a safety strip 200 at a front side, that, when the door 300 touches the frame 500, which e.g., is an aluminum or steel profile, is (slightly) compressed. The door 300 preferably has a glass or a windowpane 400. The door 300 can define an X-Y-plane. A Z-direction can be oriented perpendicular to the X-Y-plane.

The safety strip 200 comprises a sensor arrangement 100. The sensor arrangement 100 can be arranged in the upper half (in the direction of gravitation) of the safety strip 200. Preferably, the sensor arrangement 100 is arranged in the upper third, or in the upper fourth, of the safety strip 200. The sensor arrangement 100 is enclosed, or covered, by the safety strip 200 at least partly, in particular completely. The sensor arrangement 100 can be a radar sensor arrangement.

In FIG. 1a, the door 300 is closed, so that the safety strip 200 touches the frame 500. When the door 300 is closed, the sensor arrangement 100 can be set up to not take a measurement.

FIG. 1b shows the door arrangement 1000 from FIG. 1a, the door 300 being partly open. When the door 300 is open, the sensor arrangement 100 can be set up to take a measurement. To do this, the sensor arrangement 100 can emit electromagnetic radiation into a monitored area and receive electromagnetic radiation from the monitored area.

The monitored area preferably is an entrance and/or exit area of the door 300. The monitored area can extend perpendicular to a plane defined by the door (in a direction and/or in the opposite direction) over a distance of at least 0.1 m, or up to at least 3.0 m. This allows the monitoring of the monitored area for objects, e.g., persons or things.

It is intended to arrange the sensor arrangement 100 within the safety strip 200 for the most part, or even entirely. This protects the sensor arrangement 100 against vandalism, dust, and other environmental influences.

In FIG. 1b, an object 800 is located within the monitored area. The sensor arrangement 100 emits electromagnetic radiation into the monitored area (also called monitored space). The electromagnetic radiation can be reflected at the object 800. The reflected electromagnetic radiation can be received by the sensor arrangement 100. The object 800 can be identified based on the electromagnetic radiation received. Moreover, it can be identified or determined, based on the electromagnetic radiation received, how far the object 800 is away from the sensor arrangement 100. Likewise, it can be identified or determined, based on the electromagnetic radiation received, what speed the object 800 has (relative to the sensor arrangement 100). Likewise, it can be identified or determined, based on the electromagnetic radiation received, in which direction the object 800 is moving (relative to the sensor arrangement 100). It can be determined from at least one, or multiple, of these variables whether the object 800 (probably) will be caught in during a closing operation of the door 300. At least, a risk, or a probability, of the object 800 being caught in can be determined on the basis of one or several of the variables.

If getting caught is determined, or if a limit value of the probability of getting caught is exceeded, the closing operation of the door 300 can be interrupted or aborted. The sensor arrangement 100 can generate a signal. The signal can be transmitted to the control system of the door 300. Induced by the signal, the control system of the door 300 can change the control of the door 300, e.g., as mentioned, interrupt or abort the closing operation of the door.

A characteristic and/or a state of the door 300 can be included to identify or determine whether during the closing operation of the door 300 the object (probably) will be caught between the door 300 and the frame 500. Likewise, the characteristic and/or the state of the door 300 can be included to identify or determine whether a signal for changing the control of the door is generated.

For example, one characteristic of the door 300 is a closing speed, or a closing force, of the door. If the closing speed is high, a getting caught of the object can be predicted or determined also at a greater determined distance than if the closing speed is low. If the closing force is high, the consequence of getting caught (e.g., a risk of injury of a person) can be severe, so that the sensor arrangement 100 generates a signal for the control of the door 300 already in case of a lower risk of getting caught, or a lower probability of getting caught.

A state of the door 300 is, e.g., the degree of opening of the door 300. At identical distance and movement of an object 800 relative to the sensor arrangement 100, a getting caught, or a higher probability of getting caught, can be determined at a smaller degree of opening of the door 300 than at a larger degree of opening of the door 300.

FIG. 2a shows a door arrangement 1000. The door arrangement 1000 is similar to the door arrangement in FIGS. 1a and 1b, the door arrangement 1000 in FIG. 2a comprising two doors 300, 301. Each of the doors 300, 301 can be any door disclosed herein.

The doors 300, 301 can be doors of a means of transport, e.g., of a train or a bus. The doors 300, 301 are a two-wing design. The doors 300, 301 can be sliding doors.

The first door 300 comprises a safety strip 200. A sensor arrangement 100 is arranged in the safety strip 200, as described with respect to FIGS. 1a and 1b. The first door 300 can have a glass or a windowpane 400.

The second door 301 comprises a safety strip 201. A sensor arrangement 101 is arranged in the safety strip 201. The second door 301 can have a glass or a windowpane 401. Any of the doors disclosed herein can be the second door 301.

In FIG. 2a, the doors 300, 301 are closed. In the closed state, the safety strips 200, 201 of the first and the second door 300, 301 touch each other. Both safety strips can be (slightly) compressed due to that touching.

FIG. 2b shows the door arrangement 1000 in a state with open doors. The sensor arrangement 100 of the first door 300 and/or the sensor arrangement 101 of the second door 301 emit electromagnetic radiation into the monitored area. An object 800 can be located in the monitored area. The electromagnetic radiation can be reflected by the object 800. The radiation reflected by the object 800 can be received by the sensor arrangement 100 of the first door 300 and/or by the sensor arrangement 101 of the second door 301. Due to the electromagnetic radiation, the object can be detected, preferably as described in FIGS. 1a and 1b. In particular, the sensor arrangement 100 of the first door 300 and/or the sensor arrangement 101 of the second door 301 can determine or identify a position or a location, a distance between the respective sensor arrangement and the object, a speed of the object (relative to the respective sensor arrangement) and/or a direction of movement of the object (relative to the respective sensor arrangement).

Each of the sensor arrangements 100, 101 can generate a signal for a control of the respective door 300, 301. A movement of the respective door 300, 301 can be changed based on the signal or the signals. Likewise, a movement of the first and the second door 300, 301 can be changed based on the signal transmitted by only one of the sensor arrangements 100, 101.

FIG. 3a shows a schematic section through the safety strip 200. Moreover, FIG. 3a shows a schematic section through a section of the door 300.

The door 300 can comprise a fastening receiver 310. The safety strip 200 can be inserted into the fastening receiver 310 to connect the safety strip 200 to the door 300. The connection can be non-positive and/or positive. The connection can be detachable. The door 300 can have a first leg 320, and a second leg 330 at a front side. Also, the door 300 can have a first projection 340, and a second projection 350, preferably at the front side of the door 300. The fastening receiver 310 can be formed between the first leg 320 and the second leg 330. The first projection 340, and the second projection 350 can effect positive locking with the safety strip 200, in particular in the direction of the front side to which the safety strip 200 is fastened.

The safety strip 200 can have a fastening section 240. The fastening section 240 can be shaped complementary to the fastening receiver 310. The fastening section 240 can be insertable or pushable into the fastening receiver 310 to connect the safety strip 200 to the door 300. The fastening section 240 can have a dovetailed design. The connection between the safety strip 200 and the door 300 can be a dovetail connection. The safety strip 200 can be connected to the door 300 across its entire length.

The safety strip 200 can have a first receiving space 210. The first receiving space 210 can extend across the entire length of the safety strip 200. Alternatively, the first receiving space 210 can extend across the length of the safety strip 200 only in sections. In particular, the first receiving space 210 is open at two sides, or at not more than one side, with the opening, or openings, preferably being located at axial ends (in longitudinal direction). Perpendicular to the longitudinal extension of the safety strip 200, the first receiving space 210 can be without openings, i.e., have no opening, or be completely enclosed by the safety strip 200, or by the material of the safety strip 200.

The safety strip 200 can have a second receiving space 220. The second receiving space 220 can extend across the entire length of the safety strip 200. Alternatively, the second receiving space 220 can extend across the length of the safety strip 200 only in sections. In particular, the second receiving space 220 is open at two sides, or at not more than one side, with the opening, or openings, preferably being located at axial ends (in longitudinal direction). Perpendicular to the longitudinal extension of the safety strip 200, the second receiving space 220 can be without openings, i.e., have no opening, or be completely enclosed by the safety strip 200, or by the material of the safety strip 200.

The safety strip 200 can have a third receiving space 250. The third receiving space 250 can extend across the entire length of the safety strip 200. Alternatively, the third receiving space 250 can extend across the length of the safety strip 200 only in sections. In particular, the third receiving space 250 is open at two sides, or at not more than one side, with the opening, or openings, preferably being located at axial ends (in longitudinal direction). Perpendicular to the longitudinal extension of the safety strip 200, the third receiving space 250 can have at least one opening, preferably at least two or three openings.

The safety strip 200 can have a hollow space 230. The hollow space 230 can extend across the entire length of the safety strip 200. Alternatively, the hollow space 230 can extend across the length of the safety strip 200 only in sections. In particular, the hollow space 230 is open at two sides, or at not more than one side, with the opening, or openings, preferably being located at axial ends (in longitudinal direction). Perpendicular to the longitudinal extension of the safety strip 200, the hollow space 230 can have at least one opening, preferably at least two or three openings. Perpendicular to the longitudinal extension of the safety strip 200, the hollow space 230 can have at least one opening, preferably at least two or three openings. Perpendicular to the longitudinal extension of the safety strip 200, the hollow space 230 can be without openings, i.e., have no opening, or be completely enclosed by the safety strip 200, or by the material of the safety strip 200. Likewise, the hollow space 230 can be completely closed, i.e., have no opening, or be completely enclosed by the safety strip 200, or by the material of the safety strip 200.

FIG. 3b shows the safety strip 200 in a state in which it is connected to the door 300. The fastening section 240 of the safety strip 200 can be arranged in the fastening receiver 310 of the door 300.

The sensor arrangement 100 is arranged in the first receiving space 210. Due to the design of the first receiving space 210, electromagnetic radiation passes through the safety strip 200, or through the material of the safety strip 200, when the sensor arrangement 100 emits electromagnetic radiation into the monitored area. The receiving space 210 is arranged in particular between a fastening area of the safety strip 200, and a contact area of the safety strip 200. In this way, reliable reception of the sensor arrangement 100 can be ensured, and the other functions of the safety strip 200 can still be guaranteed. Also, electromagnetic radiation from the monitored area can pass through the safety strip 200, or through the material of the safety strip 200, when the sensor arrangement 100 receives electromagnetic radiation. Preferably, the first receiving space 210 is designed within the safety strip 200 in such a way that electromagnetic radiation from the sensor arrangement 100 into the monitored area and/or from the monitored area to the sensor arrangement 100 only (i.e., exclusively) passes through the material of the safety strip 200, or through the safety strip 200. If additional elements are arranged along the path of the electromagnetic radiation between the sensor arrangement 100 and the monitored area, part of the electromagnetic radiation might be absorbed and/or reflected, which might falsify the measurement.

A contact strip 270 can be arranged within the second receiving space 220. In the direction of a front side of the door 300, or the contact area of the safety strip 200, in particular the front side of the door 300 where the safety strip 200 is arranged or connected, the hollow space 230 can be arranged in front of the second receiving space 220. The hollow space 230 in front of the second receiving space 220 in which the contact strip 270 is arranged facilitates a deformation of the safety strip 200, or of the material of the safety strip 200. Due to this, the contract strip 270 can trigger at a lower force than without the hollow space 230. When the contract strip 270 triggers, at least one section of the safety strip 200 is compressed in such a way that an object has been, or is probable to have been, caught in. When it triggers, the contact strip 270 can send a signal to the control system of the door 300 based on which the movement of the door 300 is changed, e.g., a closing operation is interrupted or aborted.

A light curtain arrangement 280 can be arranged within the third receiving space 250. The light curtain arrangement 280 can be arranged within the third receiving space 250 in such a way that the light curtain arrangement 280 emits light into the monitored area, preferably in a wavelength range not visible to humans. A receiver for the light can be provided at a frame, or a door, located opposite the light curtain arrangement 280. The light curtain arrangement 280 can trigger when reception of the light is interrupted, e.g., by an object within the monitored area. When the light curtain arrangement 280 triggers, a signal can be sent to the control system of the door 300, based on which the movement of the door 300 is changed, e.g., a closing operation is interrupted or aborted.

The contact strip 270, the light curtain arrangement 280, the second receiving space 220, the third receiving space 250 and/or the hollow space 230 are optional.

FIG. 4 shows a schematic diagram of a sensor arrangement 100. The sensor arrangement 100 can comprise a receiving arrangement 110. The receiving arrangement 110 can comprise at least one antenna, preferably at least two antennae, more preferably at least three antennae, more preferably at least four antennae. Each of the antennae R1, R2, R3, R4 can receive electromagnetic radiation from the monitored area.

In the receiving arrangement 110, the distance between any two of the antennae R1, R2, R3, R4 can be a distance sR1 of between 0.1 to 0.9, or, especially preferred, of approximately half the wavelength of the electromagnetic radiation (approximately 0.5 times the wavelength of the electromagnetic radiation) in a first direction. Alternatively, or in addition, the distance between any two of the antennae R1, R2, R3, R4 can be a distance sR2 of between 0.1 to 0.9, or, especially preferred, of approximately half the wavelength of the electromagnetic radiation (approximately 0.5 times the wavelength of the electromagnetic radiation) in a second direction. The first direction can be not in parallel with, in particular perpendicular to, the second direction.

The sensor arrangement 100 can comprise a transmitting arrangement 120. The transmitting arrangement 120 can comprise at least one antenna, preferably at least two antennae, more preferably at least three antennae. Each of the antennae T1, T2, T3 can emit electromagnetic radiation into the monitored area.

In the transmitting arrangement 120, the distance between any two of the antennae T1, T2, T3 can be a distance sT1 of between 0.6 to 1.5, or, especially preferred, of approximately one times the wavelength of the electromagnetic radiation (approximately 1.0 times the wavelength of the electromagnetic radiation) in a first direction. Alternatively, or in addition, the distance between any two of the antennae T1, T2, T3 can be a distance sT2 of between 0.6 to 1.5, or, especially preferred, of approximately one times the wavelength of the electromagnetic radiation (approximately 1.0 times the wavelength of the electromagnetic radiation) in a second direction. The first direction can be not in parallel with, in particular perpendicular to, the second direction.

The sensor arrangement 100 can comprise a controller 130. The controller 130 can be set up to control the sensor arrangement 100. In particular, the controller 130 is set up to control the transmitting arrangement 120. The emission of electromagnetic radiation into the monitored area can be controllable by the controller 130. In particular, the controller can receive signals from a further control system, which signal that an opening or closing operation of the one, or multiple, doors shall start, and that activation of the sensor arrangement 100 is necessary. The controller 130 can be set up to edit and/or evaluate signals from the receiving arrangement 110. Alternatively, the controller 130 can be located outside of the sensor arrangement 100.

The sensor arrangement 100 can comprise a power supply system 140. The power supply system 140 can supply energy, in particular electric energy, to the sensor arrangement 100. The power supply system 140 can comprise a battery or a rechargeable battery. The power supply system 140 can be set up to receive electric power wirelessly, e.g., by means of induction. Alternatively, or in addition, the power supply system 140 can be connected to a power supply outside of the safety strip 200. The connection can be a hardware-based connection, e.g., wiring.

The sensor arrangement 100 can comprise a data interface 150. The data interface 150 can be set up to transmit data to outside of the safety strip 200 wirelessly or by wire. Alternatively, or in addition, the data interface 150 can be set up to receive data from outside of the safety strip 200 wirelessly or by wire. In particular, the data interfaces 150 is connected to a control system of the door.

The sensor arrangement 100 can comprise a memory 160. The memory 160 can comprise a volatile memory and/or a non-volatile memory. Data from the receiving arrangement 110 can be stored in the memory 160. An algorithm, or multiple algorithms, for evaluating data in the memory 160, in particular data from the receiving arrangement 110, can be stored in the memory 160.

FIG. 5a to 5d show measurements by the sensor arrangement 100 of a door arrangement 1000. In FIG. 5a, at least one door is open, in particular both doors. The sensor arrangement 100 emits electromagnetic radiation into the monitored area and receives electromagnetic radiation from the receiving area. No object (to be detected) is located within the monitored area.

The measurement is visualized in FIG. 5b to 5c. FIG. 5b shows a diagram on the basis of the electromagnetic radiation received. An angle in degrees (°) is plotted against a distance in meters (m). Different signal intensities in decibels (dB) are indicated by areas of different color or shading. In FIG. 5b, the angle is an azimuth angle.

FIG. 5b shows several areas of relatively high signal intensity. These areas are caused by reflections of the electromagnetic radiation emitted by the sensor arrangement 100. For example, an area 810 of high signal intensity is formed at a distance of approximately 1.6 m over an azimuth angle range of approximately −20° to more than 80°. This area can be caused by a reflection of the electromagnetic radiation at the floor of the door, e.g., at the floor of a bus or a train. Furthermore, an area 820 of high signal intensity is formed at a distance of approximately 0.7 m over an azimuth angle range of approximately −40° to approximately 30°. This area can be caused by a reflection of the electromagnetic radiation at a grab element, e.g., a grab pole, in the door area.

FIG. 5c shows a diagram similar to that in FIG. 5b, the angle in FIG. 5c being an elevation angle. FIG. 5c again shows several areas of higher signal intensity. For example, an area 811 of high signal intensity is formed at a distance of approximately 1.6 m and an elevation angle range of approximately 0° to more than 80°. Again, this area can be caused by a reflection of the electromagnetic radiation at the floor of the door.

FIG. 5d shows a diagram similar to that in FIGS. 5b and 5c, with the speed in meters per second (m/s) being plotted against the distance in meters (m). The diagram is marked "Doppler", because the speed measurement is based on the Doppler effect. Only low speeds (negative and positive speeds) are visible in the scenario of FIG. 5a.

The signals, as shown in FIG. 5b to 5d, can be regarded as background. If no object 800 to be detected is located within the monitored area, i.e., if the monitored area is free from objects 800 to be detected, a measurement by the sensor arrangement 100 results as shown in FIG. 5b to 5d. The background can be deducted in a further measurement, or be taken into account in a further measurement, to improve the detection of objects to be detected. The background can be an object to be detected.

FIG. 6a to 6d show a measurement by the sensor arrangement 100 where an object 800 to be detected is located within the monitored area. The object 800 is moving away from the sensor arrangement 100. In the diagram in FIG. 6b, an area 800b with a higher signal intensity is visible, which is in addition to the diagram in FIG. 5b. The area 800b is formed at a distance of approximately 0.6 m and an azimuth angle range of approximately −25° to approximately 0°. This area 800b is caused by a reflection of the electromagnetic radiation at the object 800 to be detected.

Analogously, an area 800b is visible in the diagram in FIG. 6c, which is in addition to the diagram in FIG. 5c. This area is formed at a distance of approximately 0.6 m and an elevation angle of approximately 0° to approximately 60°. Again, the area 800c is caused by a reflection of the electromagnetic radiation at the object 800 to be detected.

In FIG. 6d, an area 800d of increased signal intensity is formed at a distance of approximately 0.6 m and a speed of approximately 0.5 m/s, which is due to the reflection of the electromagnetic radiation at the object 800 to be detected. The positive speed indicates that the object 800 is moving away from the sensor arrangement 100.

FIG. 7a to 7d show a measurement by the sensor arrangement 100 where an object 800 to be detected is located within the monitored area. The object 800 is moving in the direction of the sensor arrangement 100, i.e., the object 800 is moving towards the sensor arrangement 100.

An area 800b at a distance of approximately 0.4 m and an azimuth angle range of approximately −60° to approximately 20° is visible in FIG. 7b, an area 800c at a distance of approximately 0.4 m and an elevation angle range of approximately 0° to more than 80° is visible in FIG. 7c, and an area 800d at a distance of approximately 0.4 m and a speed of approximately −0.5 m/s is visible in FIG. 7d. The areas 800b, 800c, and 800d are caused by the object to be detected. The negative speed indicates that the object 800 to be detected is moving in the direction of the sensor arrangement 100, i.e., is moving towards the sensor arrangement 100.

The location of an object 800, a distance of the object 800 to the sensor arrangement 100, a speed of the object 800 relative to the sensor arrangement 100 and/or a direction of movement of the object relative to the sensor arrangement 100 can be determined from the measurement by the sensor arrangement 100. Due to this, a monitored area can be monitored especially well.

In principle, the measurement can be performed with the following steps. The controller can be set up to carry out the following steps. One or several of the steps can be optional.

The sensor arrangement can emit electromagnetic radiation, preferably within a wide solid angle range, by means of at least one antenna (transmitting antenna). The solid angle range can be at least 30°, at least 45°, at least 60°, at least 75°, or at least 90°.

Reflected electromagnetic radiation can be received by the sensor arrangement by at least two antennae (receiving antennae). Each of the antennae can be a transmitting antenna and/or a receiving antenna.

A signal preparation can be applied to the electromagnetic radiation received, in particular to a signal that is based on the electromagnetic radiation received. The signal preparation can comprise one or multiple filters. The signal can comprise the totality of all variables, e.g., for different receiving antennae.

The signal received can be resolved into intermediate information. Intermediate information can be, e.g., distances, angles, speeds and/or signal intensities and/or other, possibly abstracted, variables. The variables can enable subsequent classification of objects, e.g., as regards their type, state and/or relevance and/or additional classes. Examples of variables include "type", "state" and/or "relevance" and/or the additional classes. The classes can be subdivided into at least two subclasses. For example, "type" can be subdivided into, e.g., ["person", "door"], or "state" can be subdivided into, e.g., ["moves towards door", "moves away from door", "does not move"], or "relevance" can be subdivided into, e.g., ["relevant", "not relevant"].

The application scenario and/or the classification of objects in the scenario can be analyzed, e.g., on the basis of the direct and/or abstracted intermediate information from the step described previously. The scenario can subsequently be interpreted. A signal describing the scenario can be triggered, e.g., by the controller. For example, when monitoring a closing door and an approaching person, the signal can be a signal that can be used to abort the closing operation of the door. The scenario can be interpreted algorithmically. To interpret the scenario, an algorithm can be used that learns from data. In particular, machine learning, e.g., supervised machine learning, unsupervised machine learning, reinforcement learning, can be used for learning.

FIG. 8a shows a door 300 with a safety strip 200. A sensor arrangement 100 is arranged in the safety strip 200. FIG. 8a shows a schematic top view of the door 300. The top view shows the door in a plane perpendicular to the direction of gravitation, or in parallel with a floor.

When the sensor arrangement 100 emits electromagnetic radiation, a monitored area 900 results. The sensor arrangement 100 can be designed in such a way that the electromagnetic radiation is emitted in a wide solid angle, or solid angle range. In this way, an entrance and/or exit area can be monitored especially well, because the monitored area is relatively large. The solid angle, or solid angle range, can be at least 30°, at least 45°, at least 60°, at least 75°, or at least 90°. The solid angle, or solid angle range, can extend perpendicular to the direction of gravitation, or in parallel with the floor.

FIG. 8b shows a two-wing door arrangement. A side view of the door arrangement is shown. The side view can be oriented perpendicular to the floor, or in parallel with the direction of gravitation.

A first door 300 comprises a safety strip 200. The safety strip 200 of the first door 300 comprises a sensor arrangement 100. A second door 301 comprises a safety strip 201. The safety strip 201 of the second door 301 comprises a sensor arrangement 101.

The sensor arrangement 100 of the first door 300 and the sensor arrangement of the second door 301 can emit electromagnetic radiation into the respective monitored area 900, 901. Each of the sensor arrangements 100, 101 can emit electromagnetic radiation into the monitored area in a wide solid angle, or solid angle range. The solid angle, or solid angle range, can be at least 30°, at least 45°, at least 60°, or at least 75°. The solid angle, or solid angle range, can extend in the direction of gravitation, or perpendicular to the floor.

At least one of the monitored areas 900, 901, or each of the monitored areas 900, 901, can extend over a height of at least 30%, preferably at least 50%, more preferably at least 70%, more preferably at least 80% of the total height or total length of the respective safety strip 200, 201.

A monitored area 900, 901 can extend from the safety strip 200, 201, in which the associated sensor arrangement 100, 101 is arranged, up to an opposite frame or an opposite door.

The invention claimed is:

1. A safety seal for a door of a means of transport, comprising:
    a safety seal that is elastic or flexible, the safety seal comprising at least one receiving space; and
    a sensor arrangement that emits electromagnetic radiation into a monitored area and to receive electromagnetic radiation from the monitored area, the sensor arrangement being disposed in the at least one receiving space such that the safety seal completely encloses the sensor arrangement at least in one plane;
    wherein the sensor arrangement comprises a controller, the controller:
        determining, on a basis of the electromagnetic radiation received, whether at least one object is located within the monitored area, and
        determining a location and a speed of movement of the object on the basis of the electromagnetic radiation received in the monitored area.

2. The safety seal according to claim 1, wherein the sensor arrangement is disposed in the receiving space such that at least 25% of a surface of the sensor arrangement is enclosed by the safety seal.

3. The safety seal according to claim 1, wherein:
    the sensor arrangement is a radar sensor arrangement, the radar sensor arrangement comprising a frequency modulated continuous wave radar sensor arrangement, a continuous wave radar sensor arrangement, an M-sequence radar sensor arrangement, or a pulse modulation radar sensor arrangement.

4. The safety seal according to claim 1, wherein the sensor arrangement further comprises at least a first antenna and at least a second antenna, the first antenna emits the electromagnetic radiation into the monitored area and the second antenna receives the electromagnetic radiation from the monitored area, the first antenna and the second antenna both disposed in the at least one receiving space.

5. The safety seal according to claim 1, wherein the safety seal comprises a fastening section by means of which the safety seal is removably coupled to the door, the fastening section shaped complementary to a fastening receiver formed between a first leg and a second leg of the door.

6. The safety seal according to claim 1, wherein a length of the safety seal is a multiple of its width, and the sensor arrangement is arranged at a distance of not more than 30% of a total length of the safety seal in a longitudinal direction from an end of the safety seal.

7. The safety seal according to claim 1, wherein the controller edits, processes, or evaluates a signal that is based on the electromagnetic radiation received, and applies one or multiple filters to the signal.

8. The safety seal according to claim 1, wherein the controller generates, on the basis of the electromagnetic radiation and on the basis of a state of the door, a signal that can be used to change an operation of the door or a movement of the door of a closing operation of the door.

9. The safety seal according to claim 1, wherein:
    the sensor arrangement is a radar sensor arrangement; and
    a frequency of the electromagnetic radiation is selected from a range consisting of
        between 30 kHz and 3000 GHz,
        between 1 MHz and 3000 GHz,
        between 1 MHz and 300 GHz,
        between 6 MHz and 300 GHz,
        between 1 GHz and 300 GHz, and
        between 59 GHz and 62 GHz.

10. The safety seal according to claim 1, wherein the safety seal comprises a fastening section by means of which the safety seal is positively connectable to the door.

11. The safety seal according to claim 1, wherein the sensor arrangement emits and receives the electromagnetic radiation through a material of the safety seal that encloses the sensor arrangement.

12. A method for operating a safety seal for a door of a means of transport, comprising:
    providing the safety seal comprising a sensor arrangement that is arranged within a receiving space of the safety seal, and is completely enclosed by the safety seal at least in one plane;
    emitting, by the sensor arrangement, electromagnetic radiation into a monitored area;
    receiving, by the sensor arrangement, electromagnetic radiation from the monitored area;
    determining, on a basis of the electromagnetic radiation received, whether an object is located within the monitored space; and
    determining a location and a speed of movement of the object on the basis of the electromagnetic radiation received in the monitored area.

13. A door comprising:
    a first leg and a second leg;
    a fastening receiver formed between the first leg and the second leg; the
    a safety seal, wherein the safety seal is elastic or flexible and comprises at least one receiving space and a sensor arrangement, the safety seal having a fastening section shaped complementary to the fastening receiver;
    wherein the sensor arrangement emits electromagnetic radiation into a monitored area, and to receive electromagnetic radiation from the monitored area;
    wherein the sensor arrangement is arranged in the at least one receiving space such that the safety seal completely encloses the sensor arrangement at least in one plane; and
    wherein the sensor arrangement comprises a controller, the controller:

determining, on a basis of the electromagnetic radiation received, whether at least one object is located within the monitored area, and determining at least one of a location, a speed, and a direction of movement of the object on the basis of the electromagnetic radiation received in the monitored area.

14. The door of claim 13, wherein the fastening section is inserted into the fastening receiver.

15. The door of claim 13, further comprising a first projection extending from the first arm and a second projection extending from the second arm.

16. The door of claim 15, wherein the first projection and the second projection are positively locked with the safety strip.

17. A means of transport comprising:
 a first door in a closed state, the first door comprising;
  a first safety seal, wherein the first safety seal is elastic or flexible and comprises at least one receiving space and a sensor arrangement;
   wherein the sensor arrangement emits electromagnetic radiation into a monitored area, and to receive electromagnetic radiation from the monitored area;
   wherein the sensor arrangement is disposed in the at least one receiving space such that the safety seal completely encloses the sensor arrangement at least in one plane; and
   wherein the sensor arrangement comprises a controller, the controller:
    determining, on a basis of the electromagnetic radiation received, whether at least one object is located within the monitored area, and
    determining at least one of a location, a speed, and a direction of movement of the object on the basis of the electromagnetic radiation received in the monitored area; and
 a second door in a closed state, the second door comprising a second safety seal touching the first safety seal.

18. The means of transport according to claim 17, wherein the first door and the second door are sliding doors.

19. The means of transport of claim 17, further comprising a bus or a train, and wherein the first door and the second door are both supported by the bus or the train.

* * * * *